United States Patent
Zhang et al.

(10) Patent No.: US 12,316,723 B2
(45) Date of Patent: May 27, 2025

(54) INFORMATION CENTRIC NETWORK UNSTRUCTURED DATA CARRIER

(71) Applicant: Intel Corporation, Santa Clara, CA (US)

(72) Inventors: Yi Zhang, Portland, OR (US); Gabriel Arrobo Vidal, Hillsboro, OR (US); Srikathyayani Srikanteswara, Portland, OR (US); Francesc Guim Bernat, Barcelona (ES); Christian Maciocco, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 784 days.

(21) Appl. No.: 17/358,525

(22) Filed: Jun. 25, 2021

(65) Prior Publication Data

US 2021/0320988 A1    Oct. 14, 2021

(51) Int. Cl.
*H04L 69/18* (2022.01)
*H04L 67/63* (2022.01)
(Continued)

(52) U.S. Cl.
CPC .............. *H04L 69/18* (2013.01); *H04L 67/63* (2022.05); *H04L 69/22* (2013.01); *H04W 40/24* (2013.01); *H04W 80/06* (2013.01); *H04W 88/16* (2013.01)

(58) Field of Classification Search
CPC ......... H04L 67/63; H04L 69/22; H04L 69/18; H04W 40/24; H04W 80/06; H04W 88/16; H04W 28/0925; H04W 76/12
See application file for complete search history.

(56) References Cited

U.S. PATENT DOCUMENTS

2011/0320608 A1 * 12/2011 Nelakonda .............. H04L 12/00
709/226

2016/0100350 A1 * 4/2016 Laraqui ................. H04W 60/00
370/328
(Continued)

FOREIGN PATENT DOCUMENTS

| CN | 115529677 | 12/2022 | |
| EP | 4047901 A1 * | 8/2022 | ............. H04L 12/66 |
| WO | WO-2022154725 A1 * | 7/2022 | |

OTHER PUBLICATIONS

"The 5G Infrastructure Public Private Partnership", 5G PPP, (Accessed on Mar. 23, 2022), 3 pgs.
"When necessity is the mother of invention", [Online]. Retrieved from the Internet: URL: https: cellnextrends.com en when-necessity-mother-invention , (Apr. 2, 2020), 4 pgs.
"European Application Serial No. 22164673.0, Communication Pursuant to Article 94(3) EPC mailed Nov. 17, 2023", 7 pgs.
"European Application Serial No. 22164673.0, Extended European Search Report mailed Aug. 11, 2022", 10 pgs.
(Continued)

*Primary Examiner* — Jackie Zuniga Abad
*Assistant Examiner* — Latresa A McCallum
(74) *Attorney, Agent, or Firm* — Schwegman Lundberg & Woessner, P.A.

(57) ABSTRACT

System and techniques for information centric network unstructured data carrier are described herein. A user plane function (UPF) node receives an initiation for a packet data unit (PDU) session of user equipment (UE). Here, the initiation includes an indication for an ICN session and a PDU session identification (ID). The PDU session may then map the PDU session to the PDU session ID in an ICN routing data structure. Here, the ICN routing data structure is one or both of the pending interest table (PIT) or the forwarding interest base (FIB) of the UPF node. An ICN packet (interest or data packet) may be from the UE contained within a PDU on from the PDU session that conforms to an unstructured-data classification as defined by a 3GPP 5G family of standards. The ICN packet is extracted from the PDU and routed in accordance with the ICN routing data structure.

18 Claims, 21 Drawing Sheets

(51) Int. Cl.
  *H04L 69/22* (2022.01)
  *H04W 40/24* (2009.01)
  *H04W 80/06* (2009.01)
  *H04W 88/16* (2009.01)

(56) References Cited

U.S. PATENT DOCUMENTS

2018/0146071 A1* 5/2018 Himayat ............. G06F 16/9574
2019/0132251 A1* 5/2019 Dao ........................ H04L 69/22
2021/0194989 A1   6/2021 Dimitrovski et al.
2022/0159090 A1* 5/2022 Ding .................... H04L 67/568

OTHER PUBLICATIONS

Triadimas, Arief Satria, "Seamless Service Continuity in Cloud Based Lte Systems", [Online] Retrieved from the Internet:https:essay.utwente.nl 64557 I Report_Master_Thesis_Triadimas_Final.pdf, (Nov. 18, 2013), 146 pgs.

"European Application Serial No. 22164673.0, Response filed Jun. 16, 2023 to Extended European Search Report mailed Aug. 11, 2022", 11 pgs.

"European Application Serial No. 22164673.0, Communication Pursuant to Article 94(3) EPC mailed Aug. 20, 2024", 7 pgs.

* cited by examiner

INFORMATION CENTRIC NETWORK UNSTRUCTURED DATA CARRIER

TECHNICAL FIELD

Embodiments described herein generally relate to computer networking physical and transport layers and more specifically to information centric network unstructured data carrier.

BACKGROUND

The Third Generation Partnership Project (3GPP) is a standards body that develops and promulgates cellular radio standards. 5G refers to a family of 3GPP standards. Components of a 5G network include user equipment (UE), such as mobile telephones, gNodeBs (gNBs) or cellular base stations that interface via a radio interface (e.g., radio access network (RAN)) to the UEs, and a number of network interfaces and facilities, such as data bearers, user plane functions (UPFs), etc.

Information centric networking (ICN) is a transport layer or internet layer protocol that is an alternative to address based approaches, such as the Internet Protocol (IP). ICN replaces host addresses with named data (or functions in a named function networking (NFN)). ICN nodes generally include two data structures, a pending interest table (PIT) and a forwarding information base (FIB) that are used for routing.

When data is desired, a requestor releases an interest packet naming the data being sought. A receiving ICN node records the interest packet arrival along with the physical interface upon which the interest was received in a PIT entry. The ICN node uses the FIB to determine upon which physical interface to forward the interest. When a node has data that matches the name of the interest packet, such a node generally responds to the interest packet in a data packet (e.g., ICN data packet). When the data packet arrives at an interim node, that node matches the name of the data packet with a PIT entry and uses the physical interface of the PIT entry to forward the data; the PIT entry being removed once the data packet is sent.

Because only the name of the data is necessary, data may be cached throughout the network without orchestration present in host-based techniques. Thus, as a data packet traverses an interim ICN node, that node may cache the data packet to respond to future requests for the same data.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
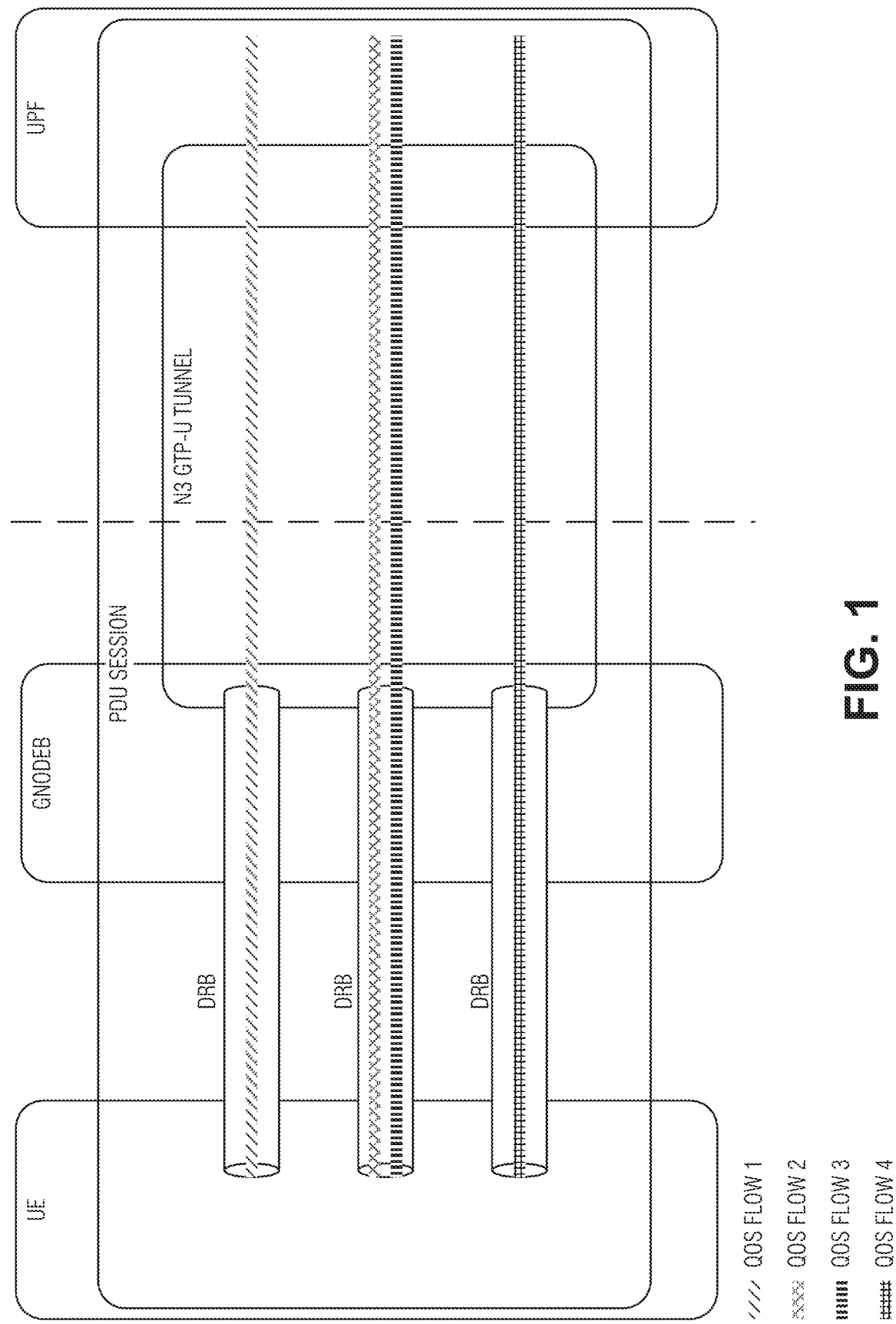
FIG. 1 illustrates an example of a 5G end-to-end session between a UE and UPF, according to an embodiment.

ICN enables a very high network efficiency by providing localized content caching for mobile devices. ICN may also be used for dynamically composing compute functions by discovering and bringing together data, hardware, or software in real-time. However, to exploit this advantage inside the cellular networks (e.g., 5G core network), ICN must be implemented within all its network elements such as gNBs, intermediate routers, and the various elements of the User Plane (UP). Such pervasive changes to these elements in a network may inhibit ICN adoption in cellular networks, most attempts to bring ICN to this environment use an ICN overlay technique, leaving the existing 5G architecture generally untouched. For example, an ICN may be enabled as a network slice of a 5G Network by extending the functionalities of the existing functional components and introducing new functional components in 5G architecture without impact the underlying IP transport infrastructure is not impacted—that is packet data unit (PDU) sessions remain unchanged. From the IP perspective in this scenario, ICN is regarded as an application and the ICN packets are running on top of the end-to-end PDU session. This is transparent to the IP layer inside the 5G network. A content provider in the data network (DN) may serve content ICN over IP. Another approach may use a hybrid ICN in which ICN fields are mapped to TCP/IP fields, such as mapping ICN names to IPv4/IPv6 addresses or TCP/UDP fields.

These attempts to integrate ICN into 5G networks have some drawbacks. For example, they do not integrate ICN at the network layer. This results in a non-optimal solution with additional overhead. Further, running ICN at the application layer may negate several advantages of ICN, such as interest aggregation, data caching on intermediate nodes, etc. Thus, multiple interests requesting the same content from different UEs are still transmitted from UEs to the producers in the ICN-DN (ICN Data Network).

Although it may be difficult to integrate ICN into 5G, the reasons for overcoming these challenges are many. Environments with highly dynamic service loads or UE mobility is becoming the norm. Processing data with the right service instance with the required service level objectives (e.g., latency), while having a proper load distribution, is a challenge. An example of such an environment is a vehicle-to-everything (V2X) architecture. In this case, the aim is to have vehicles and infrastructure connected via 5G or 5G-V2X type of connection to access services from the infrastructure. Here, one of the challenges with having thousands of edge locations and thousands of UEs accessing to these services is scalability when matchmaking between the services and the vehicles. Using a native ICN network addresses these issues very well.

To address these issues, "unstructured data" PDU sessions are used to transport ICN traffic. End-points, such as UEs and UPFs (e.g., network nodes hosting the UPF) that have ICN capabilities will enable native ICN performance without changing other aspects of the 5G network. Additional details and examples are provided below.

FIG. 1 illustrates an example of a 5G end-to-end session between a UE and UPF, according to an embodiment. 5G inherently supports "unstructured data" that accommodates non-IP data such as ICN packets. Unstructured data is new data type supported in 5G. Unstructured data refers to data for which the structure is not defined in 3GPP specifications. In this case, the 5G System is used for transporting some PDUs whose format, or structure, is unknown to the 5G System. Because the 5G System does not know, for example, where the header ends, and the payload begins—or even if there is header and payload—the 5G network will be transparent and provide a "transport pipe" between the UE and the UPF—either Intermediate UPF (I-UPF) or Anchor UPF (A-UPF). ICN packet could be regarded as unstructured data.

FIG. 1 illustrates the unstructured data PDU sessions for different flows through data radio bearers between the UE and the gNB and through general packet radio service (GPRS) tunneling protocol (GTP-U) tunnels between the gNB and the UPF. Note that the PDU sessions are established for different quality-of-service (QoS) parameters.

Some issues transporting ICN over unstructured data PDU sessions may include, how does an UPF map ICN packets to a given PDU session, how are the interfaces configured, how is the PIT maintained when ICN packets are transmitted as unstructured data, what is the impact to the 5G network entities and procedures, or how QoS is handled when ICN packets are transmitted as unstructured data?

The techniques described herein enable an ICN packet to be transmitted over PDU sessions through the 3GPP NR access and 5G Core networks. The techniques modify the current 5G procedures, including PDU Session Establishment and Mobility, to enable ICN to provide the benefits inherent to ICN operation in 5G networks. The benefits of ICN are thus brought to 5G deployments by leveraging the existing transmission mechanism for unstructured data. Any intermediate UPF or anchor UPF that has ICN functionality (e.g., is an ICN anchor-point or ICN-AP) will facilitate ICN operation over unstructured data PDU sessions. Thus, these ICN aware devices may participate in interest aggregation and caching, either at the edges of the network closer to the end-user with the I-UPF or further up the network in the Central Office with the A-UPF.

Figure 2:
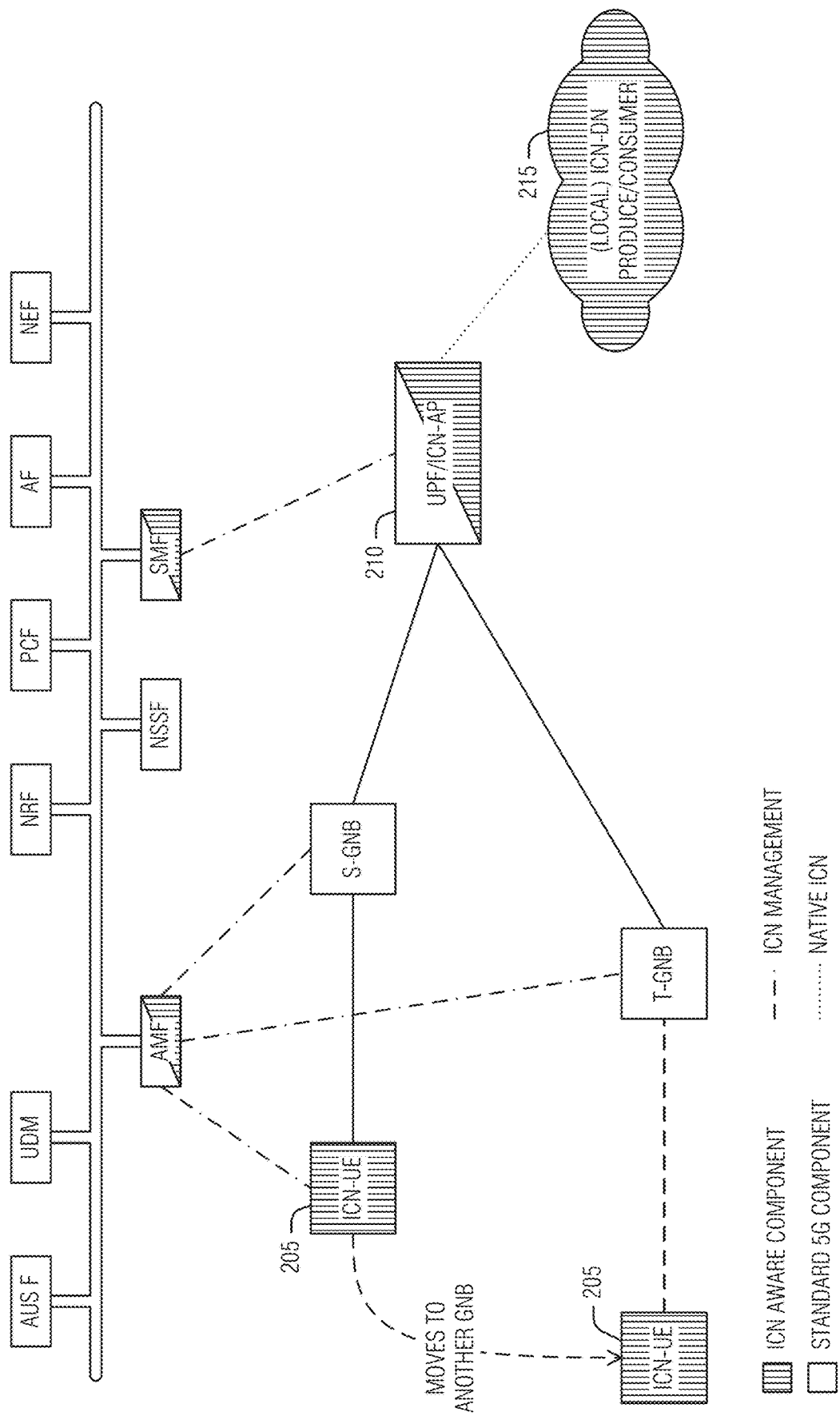
FIG. 2 illustrates an example of a network architecture, according to an embodiment.

FIG. 2 illustrates an example of a network architecture, according to an embodiment. As illustrated, the shaded components—such as the UE 205, the access and mobility management function (AMF), session management function (SMF), the UPF 210, and the ICN network 215—are ICN aware. The remaining 5G components are unchanged from the published 5G family of standards.

An ICN packet is transmitted as unstructured data within the end-to-end PDU session from UE 205 to UPF 210, which may be either an I-UPF or an A-UPF. The I-UPF is usually installed at network edges to enable branching through uplink traffic classification—such as may be used in mobile edge computing (MEC)—and the A-UPF is usually in a data center or aggregating I-UPFs. In an example, the I-UPF may be used to cache content and eliminate much upstream traffic. If content is not found in the I-UPF then the A-UPF would be next opportunity to find the content. In these scenarios, the gNB is not aware of the ICN packets. In an example, the UE is a producer, providing data from a camera or other sensor, or a consumer requesting data or compute resources from the ICN-DN 215.

The 5G user plane (e.g., the ICN-AP on the UPF 210) is the terminus of the unstructured data PDU session. From here, ICN native service may begin. Compared to the traditional anchor points as in UPF the ICN-AP may operate as a service gateway to host services or cache content enabled through the ICN architecture. In an example, the ICN-AP also includes UPF functions to manage multiple tunnel interfaces. In an example, ICN-AP manages ICN functions—such as name-based forwarding, sharing caching or compute resources—operating as a full featured ICN node.

The SMF serves as control plane for the ICN state managed in the ICN-AP. The SMF handles anchor point selection for ICN services and interacts with the AMF to exchange PDU session management information for the creation, modification, or deletion of PDU sessions in UPF 210.

Figure 3:
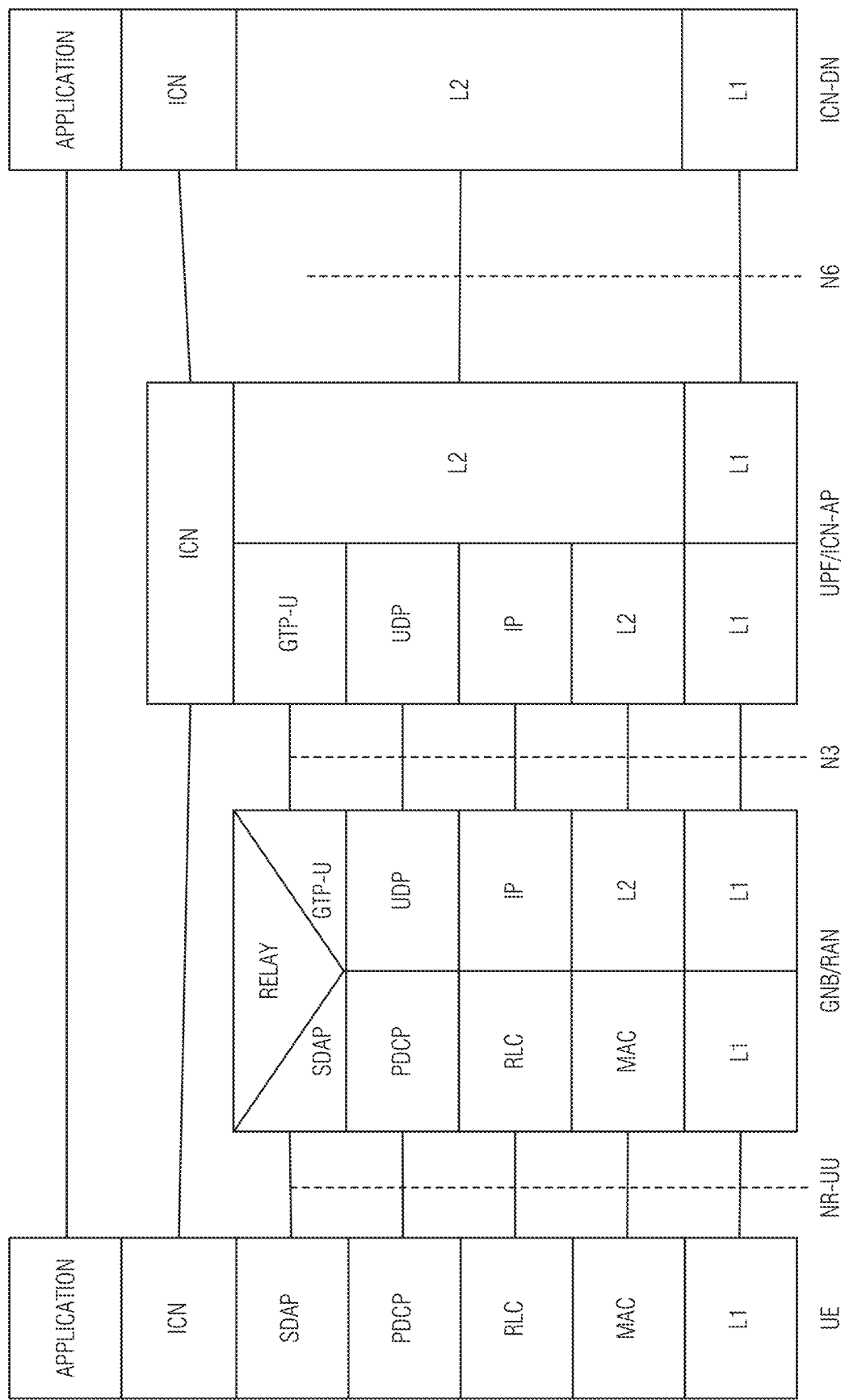
FIG. 3 illustrates an example of a user plane protocol stack when an ICN packet is transmitted as unstructured data, according to an embodiment.

FIG. 3 illustrates an example of a user plane protocol stack when an ICN packet is transmitted as unstructured data, according to an embodiment. For simplicity, only ICN (unstructured data) is illustrated in the protocol stack.

Figure 4:
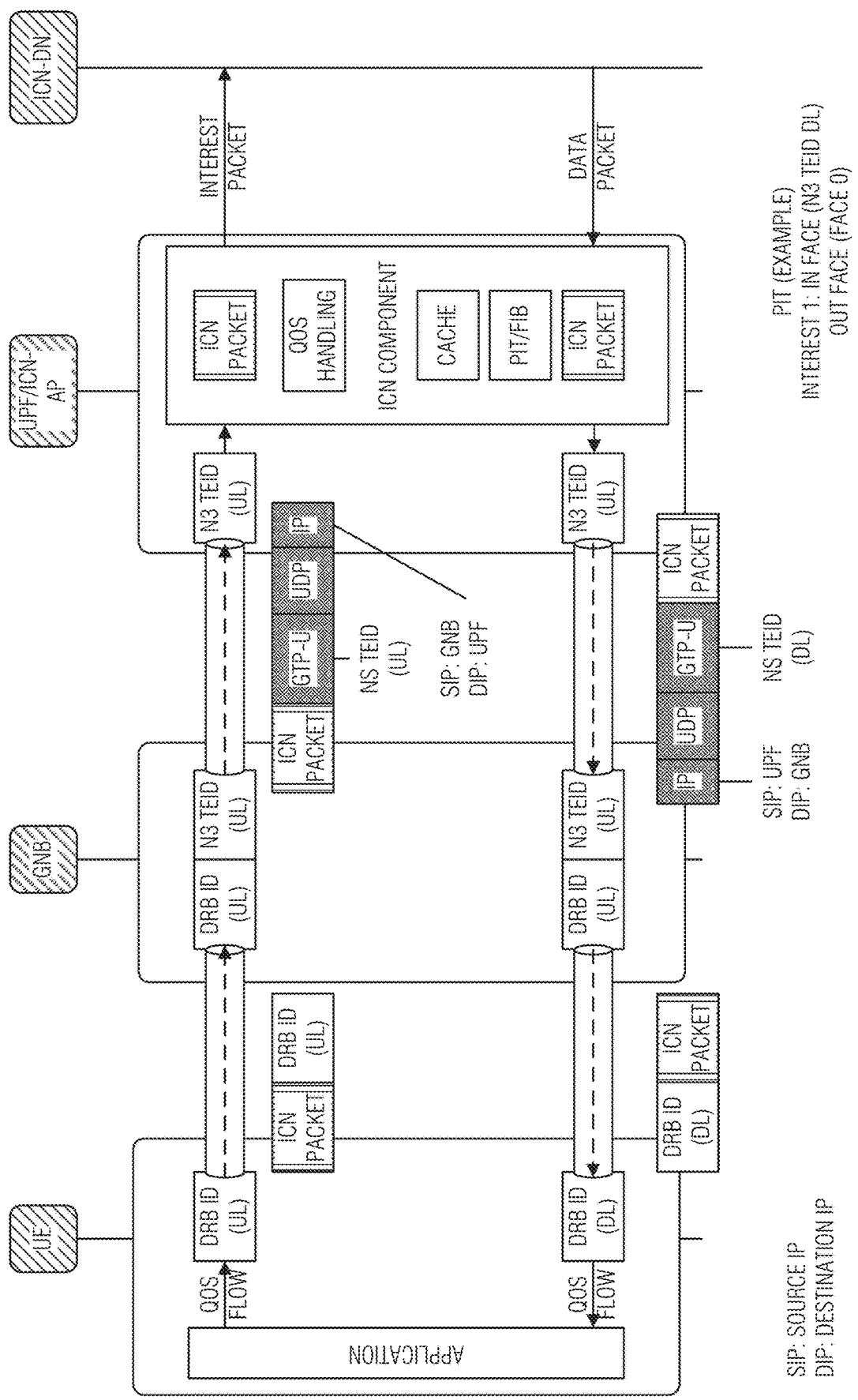
FIG. 4 illustrates an example of ICN packet transmission in a GTP tunnel, according to an embodiment.

FIG. 4 illustrates an example of ICN packet transmission in a GTP tunnel, according to an embodiment. Specifically, FIG. 4 illustrates how ICN packets are encapsulated in GTP-U packets and transmitted through the end-to-end PDU session as unstructured data. The UPF/ICN-AP installs the ICN component (e.g., service, container, virtual machine, etc.) to support ICN functionalities, such as interest aggregation or content caching. In an example, the cache is absent. For example, the I-UPF doesn't have cache while the A-UPF aggregating multiple I-UPFs has an internal content data store cache.

Figure 5:
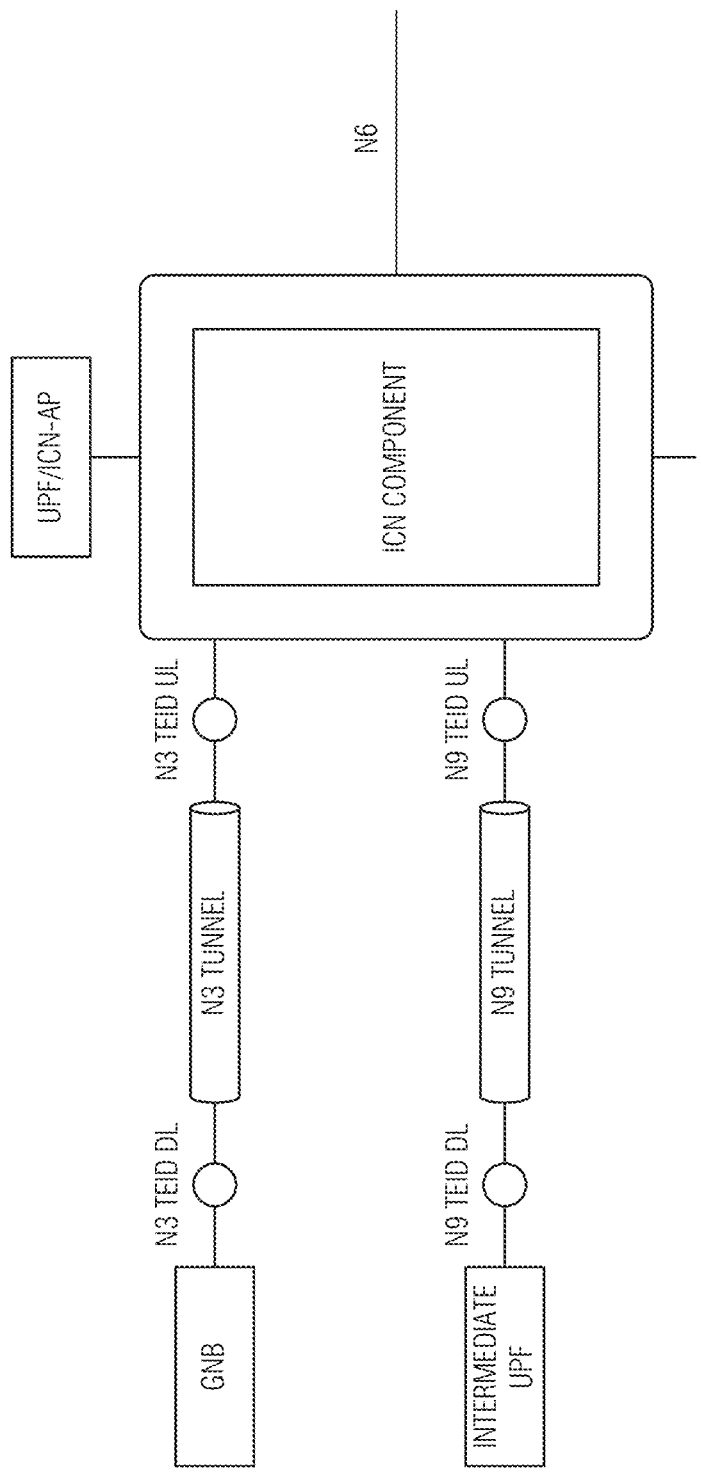
FIG. 5 illustrates an example of face setting at a UPF/ICN-AP, according to an embodiment.

When performing uplink (UL) from the UE to the ICN-DN, the following may be observed in FIG. 5:
1) The UE attempts to find some content in the ICN-DN from an ICN application running in the UE. Here, the UE is in the role of a consumer.
2) The UE determines through which PDU session and which QoS flow it should send the ICN Interest packet.
3) UE decides through which DRB to send the ICN packet. Then, it adds a DRB ID to the packet and sends it to the gNB.

4) Based on the value DRB ID (UL) in the received packet, the gNB determines which UPF and with what N3 TEID (UL) to forward the packet. Then, the gNB sends a GTP tunneling packet containing: an outer IP header set as "SIP=gNB, DIP=UPF/ICN-A," a UDP header, and (3) a GTP header set as "N3 TEID (UL)" to the UPF. Here, the TEID is a tunnel endpoint identifier that is the unique ID to each GTP connection and its peer. N3 TEID (UL) is allocated by the UPF and forwarded to the gNB when the UE establishes a PDU session.

5) The UPF/ICN-AP, based on the value "N3 TEID (UL)" in the received packet, determines which UE sent the packet (e.g., by the interface (face) that received the interest packet). Then, the UPF/ICN-AP removes the GTP tunnel header, the UDP header, and the outer IP packet header. The ICN-AP forwards the ICN packet to ICN-DN and records it in the ICN PIT table. For example:

|  | InFace | Outface |
| --- | --- | --- |
| Interest 1 | N3 TEID DL | Face 0 | when performing downlink (DL) from the ICN-DN to the UE, the following may be observed in FIG. 5:
1) The ICN data packet is sent from ICN-DN to UPF/ICN-AP.
2) The UPF/ICN-AP determines through which PDU session the packet will be sent by looking up the corresponding PIT entry created on uplink traffic.
3) The UPF/ICN-AP sends a GTP tunneling packet containing: an outer IP header set as "SIP=UPF/ICN-AP, DIP=gNB," a UDP header, and a GTP header set as "N3 TEID (DL)" to the gNB. Here, the value of N3 TEID (DL) is allocated by the gNB and forwarded to the UPF/ICN-AP when the UE establishes the PDU session.
4) The gNB, based on the value "N3 TEID (DL)" in the received packet, determines which UE and through which DRB to send the packet. Then, the gNB stripes off the GTP tunnel header, the UDP header, and the outer IP packet. The gNB adds "DRB ID (DL)" to the ICN packet and forwards it to the UE.
5) UE receives the ICN packet.

FIG. 5 illustrates an example of face setting at a UPF/ICN-AP, according to an embodiment. Face setting is used to establish a PIT or FIB entry in the ICN-AP. A FaceUri is a uniform resource identifier (URI) that represents the endpoint or communication channel used by a transport. The FaceUri is composed of a LocalUri and a RemoteUri. When an ICN packet is transmitted as unstructured data, the four-octets long TEID may be used as the FaceUri. FIG. 5 illustrates this example. Here, the UPF/ICN-AP connects gNB through N3 interface. The UPF/ICN-AP assigns N3-TEID-UL for the uplink data. The gNB assigns N3-TEID-DL for the downlink data. Similarly, if intermediate UPFs exist between the gNB and the UPF/ACN-AP, the UPF/ICN-AP assigns N9-TEID-UL for the uplink data and the intermediate UPF assign N9-TEID-DL for the downlink data.

In an example, when the UPF/ICN-AP receives UL Interest packet from UE through N3 tunnel, the interface between UPF-ICN/AP and ICN-DN (N6) is native ICN. The UPF/ICN-AP may set the face as below:

|  | In-Face | | Out-Face | |
| --- | --- | --- | --- | --- |
|  | LocalUri | RemoteUri | LocalUri | RemoteUri |
| Interest from UE | N3-TEID-UL | N3-TEID-DL | Local Mac address | Remote Mac address |
| Interest from ICN-DN | Local Mac address | Remote Mac address | N3-TEID-UL | N3-TEID-DL |

In an example, when the UPF/ICN-AP receives UL Interest packet from an intermediate UPF through N9 tunnel, the interface between the UPF-ICN/AP and the ICN-DN (N6) is ICN over IPv4. The UPF/ICN-AP may set the faces as below:

|  | InFace | | OutFace | |
| --- | --- | --- | --- | --- |
|  | LocalUri | RemoteUri | LocalUri | RemoteUri |
| Interest from UE | N9-TEID-UL | N9-TEID-DL | udp4://upf ip:port | udp4://server ip:port |
| Interest from ICN-DN | udp4://upf ip:port | udp4://server ip:port | N9-TEID-UL | N9-TEID-DL |

In an example, the UE may set the faces as below:

|  | InFace | | OutFace | |
| --- | --- | --- | --- | --- |
|  | LocalUri | RemoteUri | LocalUri | RemoteUri |
| Interest from UPF | DRB ID + optional UE ID | DRB ID + optional info (gNBID) | App | App |
| Interest from App | App | App | DRB ID + optional UE ID | DRB ID + optional gNB ID |

Figure 6:
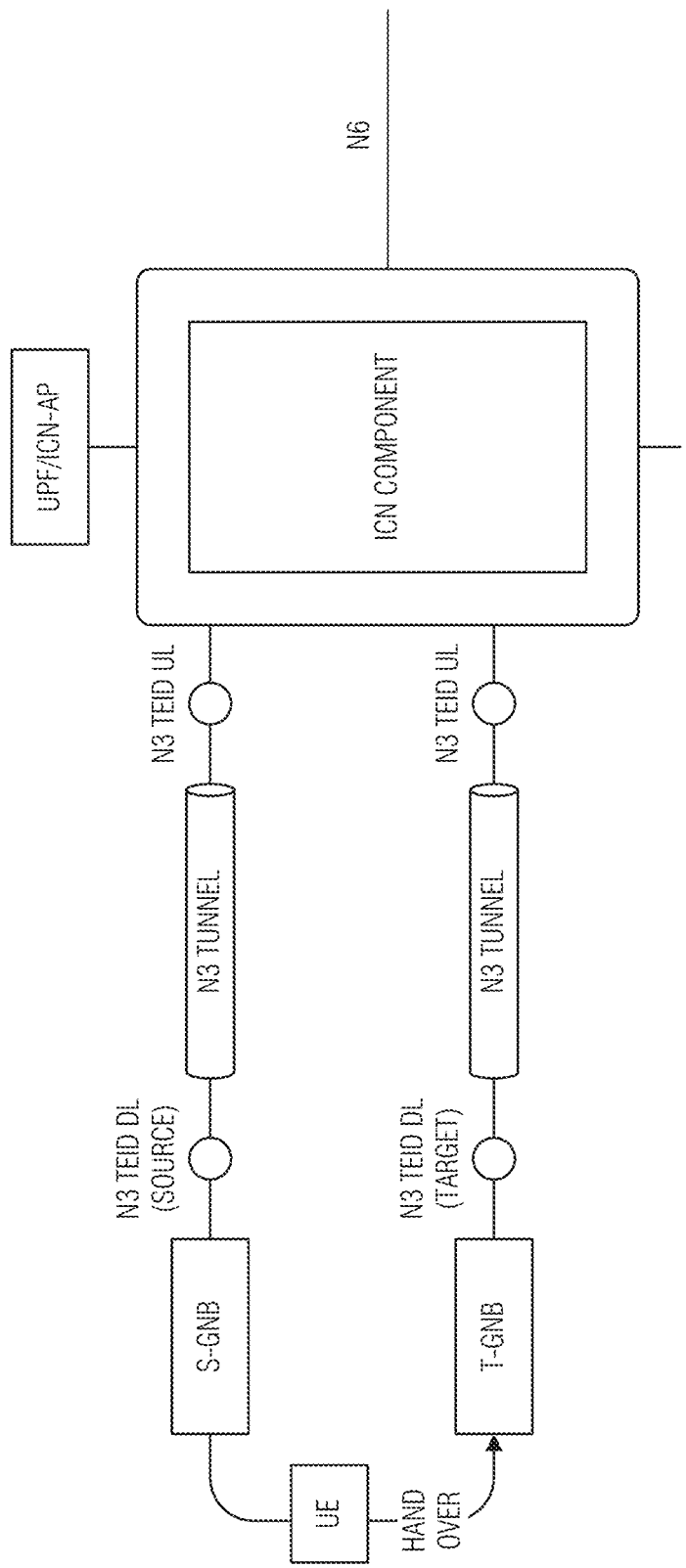
FIG. 6 illustrates an example of face setting at handover, according to an embodiment.

FIG. 6 illustrates an example of face setting at handover, according to an embodiment. When an inter-gNB handover occurs, the N3 tunnel uplink identifier "N3 TEID UL" is unchanged. However, the N3 tunnel downlink identifier "N3 TEID DL" changes when the GTP tunnel is switched from source gNB (S-gNB) to the target gNB (T-gNB). Here, the N3-TEID-DL is updated after the UPF/ICN-AP is notified that the N3 tunnel has been switched to another gNB.

Figure 7A:
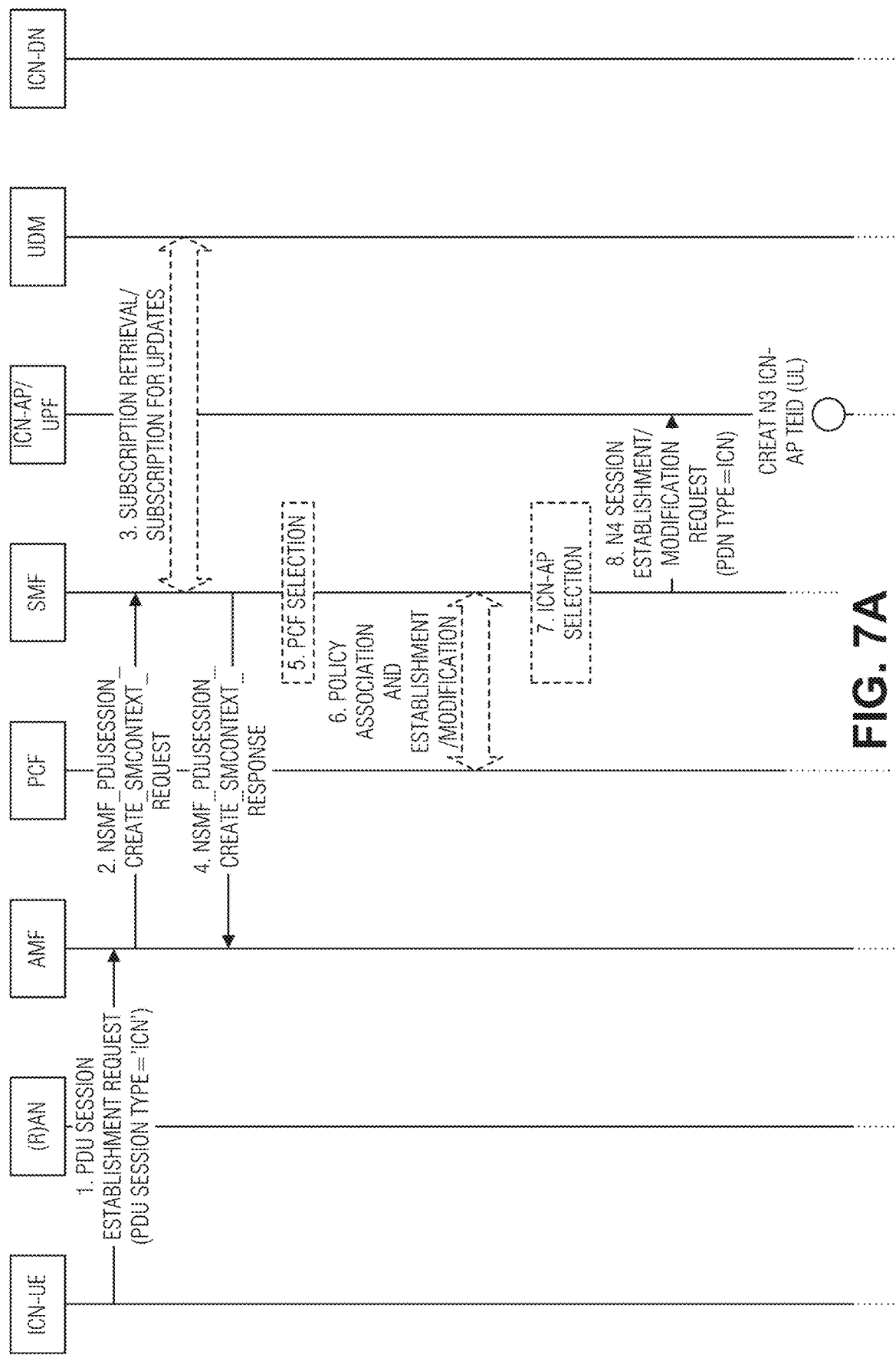
FIGS. 7A-7C illustrate an example of PDU session establishment for ICN, according to an embodiment.
Figure 7B:
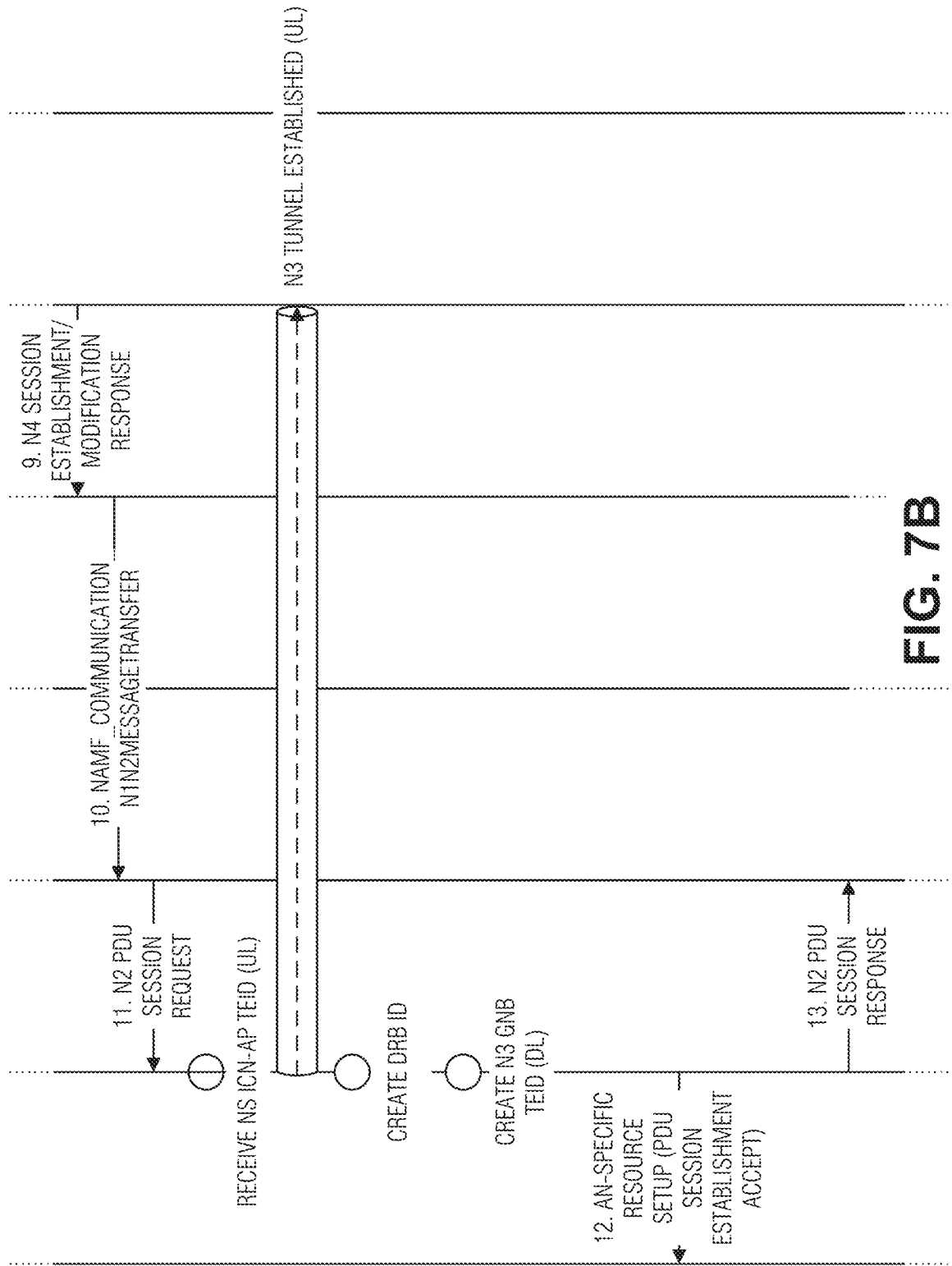
Figure 7C:
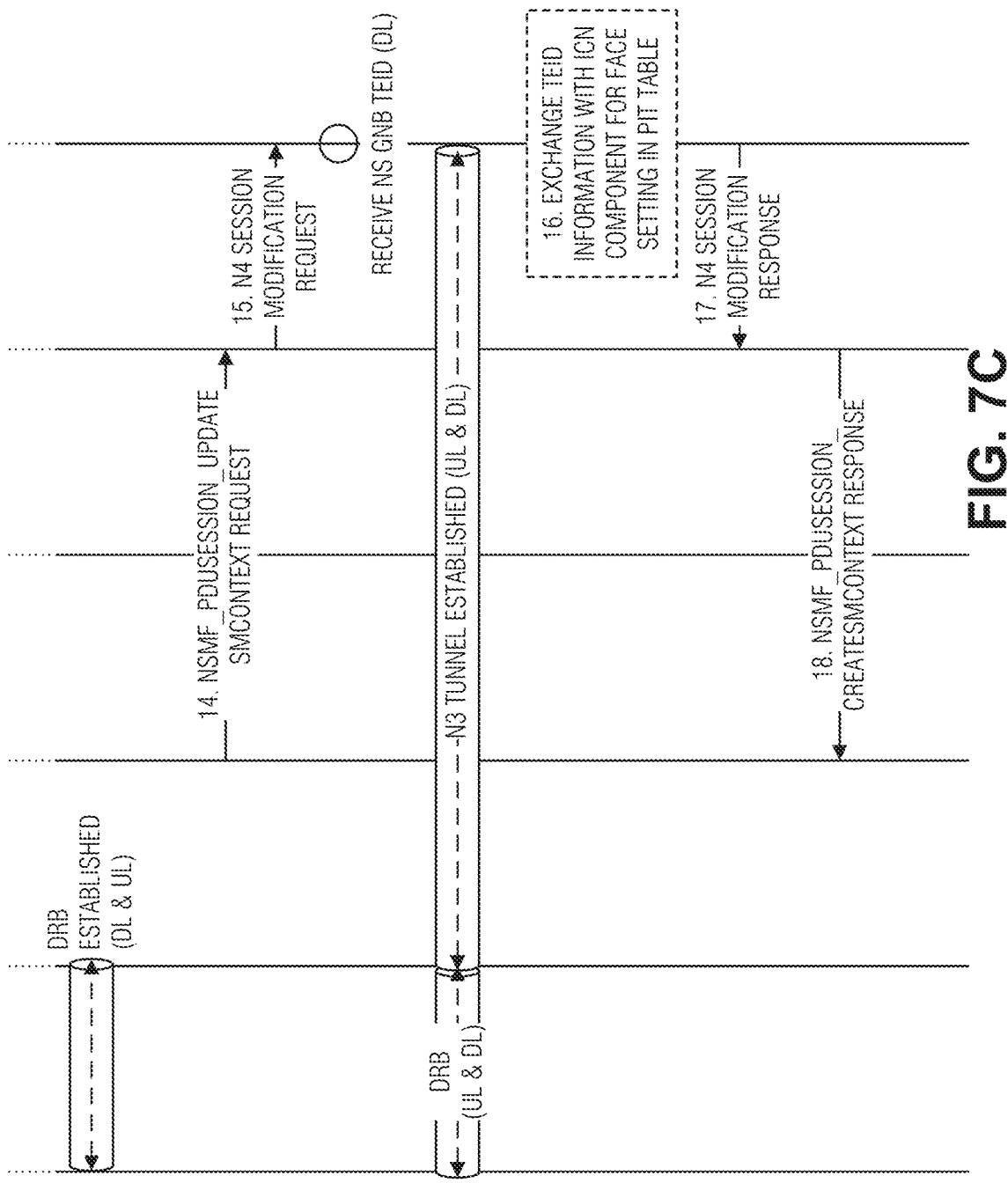

FIGS. 7A-7C illustrate an example of PDU session establishment for ICN, according to an embodiment. The 5G PDU session management is modified to accommodate ICN services. 5G PDU session management includes PDU session establishment, modification, or release between the gNB and the ICN-AP. FIGS. 7A-7C illustrate examples of these operations to enable ICN services.

Operation 1: in in a PDU session establishment request, a new PDU session type, defined as "ICN," is used.

Operation 2: when the AMF receives the request for the ICN type of PDU session, the AMF includes the information in a Nsmf_PDUSession_CreateSMContext_request message.

Operations 3-6: subscription and policy updates are performed.

Operation 7: the SMF selects a UPF which can support ICN functionality and work as ICN anchor point.

Operations 8-9: the SMF sends a N4-session establishment request to the selected UPF/ICN-AP. This request uses the ICN PDN type. The UPF/ICN-AP then assigns UL TEID for the N3 GTP tunnel.

Operations 10-14: the SMF contacts the AMF, which then requests that the gNB assigns a radio resource. A DRB is setup for both the uplink and the downlink. The N3 UL GTP tunnel is then established.

Operation 15: the SMF informs the ICN-AP that both the downlink and the uplink GTP tunnels are established.

Operation 16: once the UPF/ICN-AP receives the packet from UE via the GTP-U tunnel, the UPF/ICN-AP forwards the packet to the ICN service along with the TEID information. The ICN service may then use the TEID to assist with face setting (e.g., for a PIT or FIB entry).

Operations 17-18: propagate modifications to the SMF and AMF from the UPF/ICN-AP.

Figure 8:
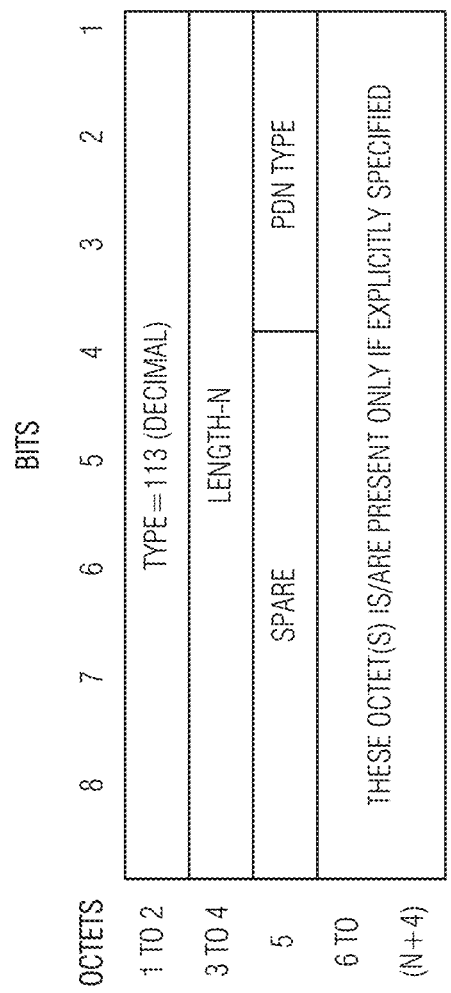
FIG. 8 illustrates an example of a PDN type data structure, according to an embodiment.

FIG. 8 illustrates an example of a PDN type data structure, according to an embodiment. The 5G PDN Type may follow the illustrated format. It indicates the type of a PDN connection (IP, Ethernet or Unstructured). The PDN Type is encoded as a three-bit binary integer value as specified below:

| PDN Type | Value (Decimal) |
|---|---|
| IPv4 | 1 |
| IPv6 | 2 |
| IPv4v6 | 3 |
| Non-IP | 4 |
| Ethernet | 5 |
| For future use. Shall not be sent. | 0, 6, 7 |

Values 1-5 are used in the 5G family of standards. Values 0, 6, 7 are reserved by the standard for other uses. The "ICN" PDN Type may be set to 0, 6 or 7.

5G release 16 supports a maximum of one 5G QoS Flow per PDU Session of Type Unstructured. For unstructured PDU Sessions, the default QoS rule does not contain a packet filter set. In this case, the default QoS rule defines the treatment of all packets in the PDU Session.

The concepts above may be expanded into multi-tenancy or multi-domain environments. Here, resources, access, or 5G ICN are partitioned in domains. For example, a ICN 5G partition may have one or more of the properties:
1. Security: What (e.g., who) can access the ICN slices and what can be seen. The PDU session capability for interfaces enables a variety of options, such as high security and low security ICN streams.
2. Caching: What this ICN slice allows access to. For example, associating filters or transformations when data gets accessed through a particular slice.
3. Quality of Service: today slicing is mostly designed to partition in terms physical isolation (e.g., security) and QoS. Hence, each ICN slice may have a network (5G) QoS level in addition to a compute or service response QoS level.

In general, an ICN slice may have a set of different features or meta-data that dictate the aspects above. Although 5G may provide access, backhaul connectivity may go in any direction, such as through a satellite, via a wired ethernet interface, etc. The variety end points that can be accessed through slices is powerful.

Figure 9:
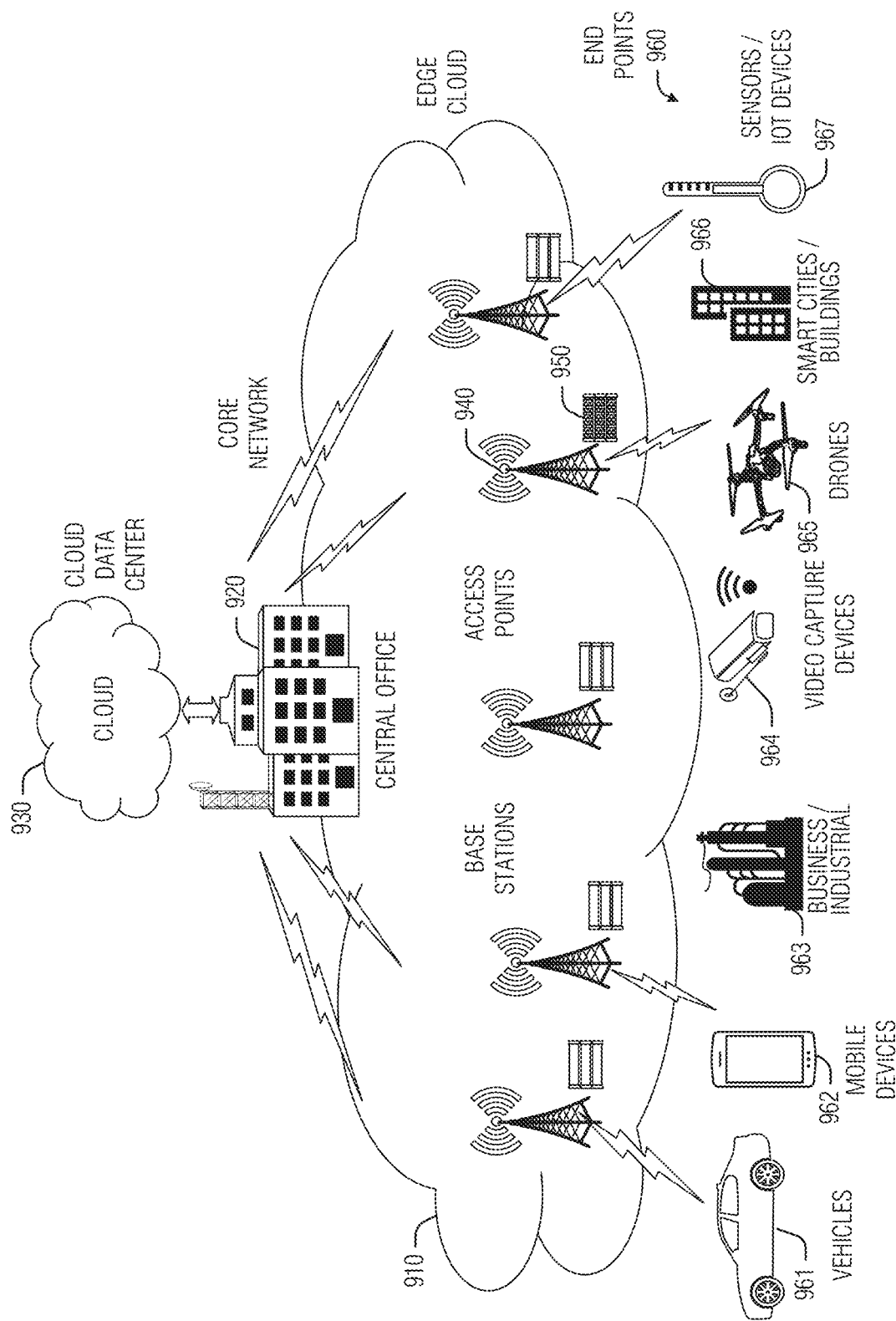
FIG. 9 illustrates an overview of an edge cloud configuration for edge computing.

FIG. 9 is a block diagram showing an overview of a configuration for edge computing, which includes a layer of processing referred to in many of the following examples as an "edge cloud". As shown, the edge cloud 910 is co-located at an edge location, such as an access point or base station 940, a local processing hub 950, or a central office 920, and thus may include multiple entities, devices, and equipment instances. The edge cloud 910 is located much closer to the endpoint (consumer and producer) data sources 960 (e.g., autonomous vehicles 961, user equipment 962, business and industrial equipment 963, video capture devices 964, drones 965, smart cities and building devices 966, sensors and IoT devices 967, etc.) than the cloud data center 930. Compute, memory, and storage resources which are offered at the edges in the edge cloud 910 are critical to providing ultra-low latency response times for services and functions used by the endpoint data sources 960 as well as reduce network backhaul traffic from the edge cloud 910 toward cloud data center 930 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or, bring the workload data to the compute resources.

The following describes aspects of an edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices which are much closer to endpoint devices producing and consuming the data. For example, edge gateway servers may be equipped with pools of memory and storage resources to perform computation in real-time for low latency use-cases (e.g., autonomous driving or video surveillance) for connected client devices. Or as an example, base stations may be augmented with compute and acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services which the compute resource will be "moved" to the data, as well as scenarios in which the data will be "moved" to the compute resource. Or as an example, base station compute, acceleration and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

Figure 10:
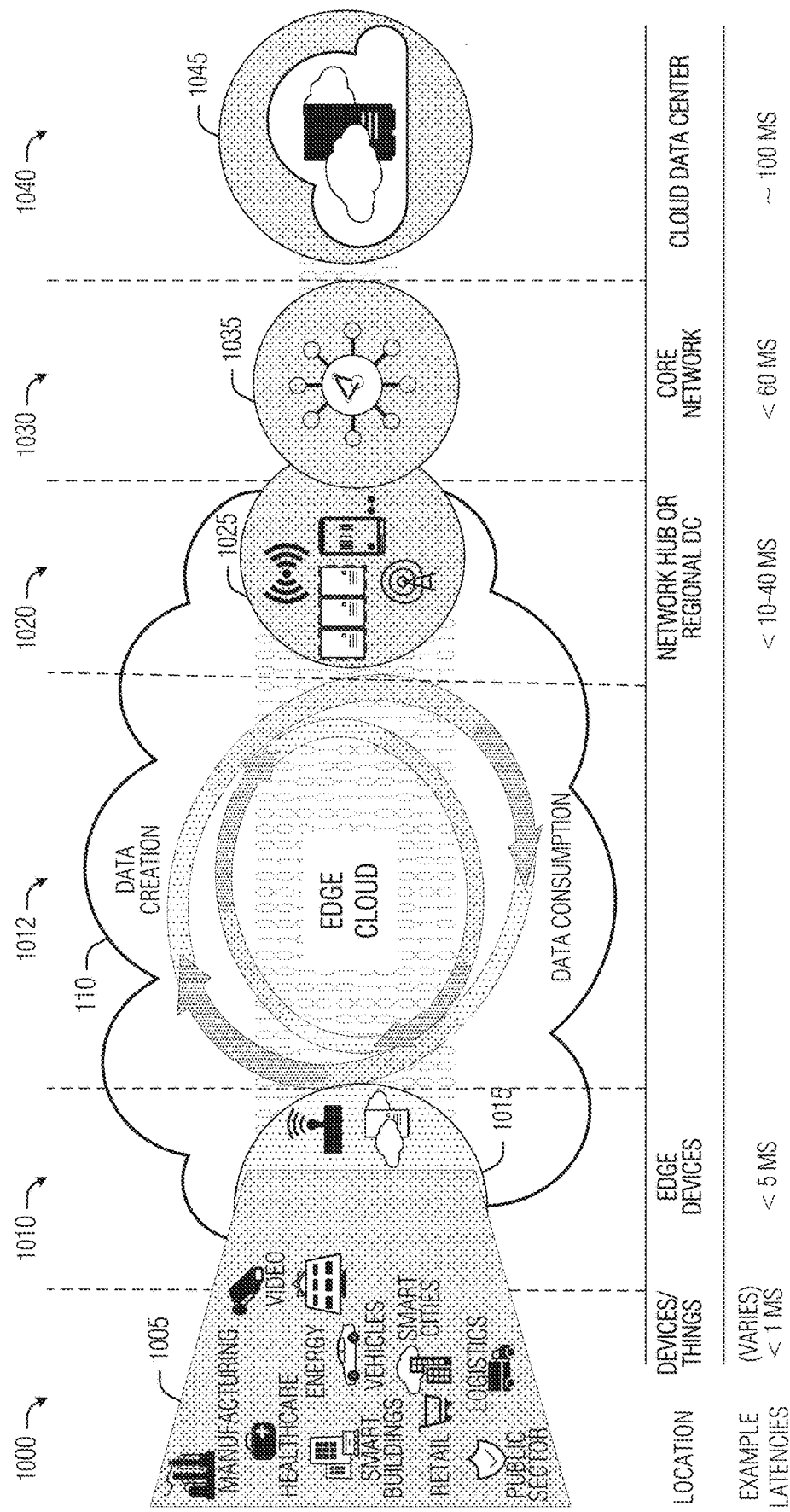
FIG. 10 illustrates operational layers among endpoints, an edge cloud, and cloud computing environments.

FIG. 10 illustrates operational layers among endpoints, an edge cloud, and cloud computing environments. Specifically, FIG. 10 depicts examples of computational use cases 1005, utilizing the edge cloud 910 among multiple illustrative layers of network computing. The layers begin at an endpoint (devices and things) layer 1000, which accesses the edge cloud 910 to conduct data creation, analysis, and data consumption activities. The edge cloud 910 may span multiple network layers, such as an edge devices layer 1010 having gateways, on-premise servers, or network equipment (nodes 1015) located in physically proximate edge systems; a network access layer 1020, encompassing base stations, radio processing units, network hubs, regional data centers (DC), or local network equipment (equipment 1025); and any equipment, devices, or nodes located therebetween (in layer 1012, not illustrated in detail). The network communications within the edge cloud 910 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1000, under 5 ms at the edge devices layer 1010, to even between 10 to 40 ms when communicating with nodes at the network access layer 1020. Beyond the edge cloud 910 are core network 1030 and cloud data center 1040 layers, each with increasing latency (e.g., between 50-60 ms at the core network layer 1030, to 100 or more ms at the cloud data center layer). As a result, operations at a core network data center 1035 or a cloud data center 1045, with latencies of at least 50 to 100 ms or more, will not be able to accomplish many time-critical functions of the use cases 1005. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1035 or a cloud data center 1045, a central office or content data network may be considered as being located within a "near edge" layer ("near" to the cloud, having high latency values when communicating with the devices and endpoints of the use cases 1005), whereas an access point, base station, on-premise server, or network gateway may be considered as located within a "far edge" layer ("far" from the cloud, having low latency values when communicating with the devices and endpoints of the use cases 1005). It will be understood that other categorizations of a particular network layer as constituting a "close", "local", "near", "middle", or "far" edge may be based on latency, distance, number of network hops, or other measurable characteristics, as measured from a source in any of the network layers 1000-1040.

The various use cases 1005 may access resources under usage pressure from incoming streams, due to multiple services utilizing the edge cloud. To achieve results with low latency, the services executed within the edge cloud 910 balance varying requirements in terms of: (a) Priority (throughput or latency) and Quality of Service (QoS) (e.g., traffic for an autonomous car may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor).

The end-to-end service view for these use cases involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to SLA, the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 910 may provide the ability to serve and respond to multiple applications of the use cases 1005 (e.g., object tracking, video surveillance, connected cars, etc.) in real-time or near real-time, and meet ultra-low latency requirements for these multiple applications. These advantages enable a whole new class of applications (Virtual Network Functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 910 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 910 (network layers 1000-1040), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems which include discrete or connected hardware or software configurations to facilitate or use the edge cloud 910.

As such, the edge cloud 910 is formed from network components and functional features operated by and within edge gateway nodes, edge aggregation nodes, or other edge compute nodes among network layers 1010-1030. The edge cloud 910 thus may be embodied as any type of network that provides edge computing or storage resources which are proximately located to radio access network (RAN) capable endpoint devices (e.g., mobile computing devices, IoT devices, smart devices, etc.), which are discussed herein. In other words, the edge cloud 910 may be envisioned as an "edge" which connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage or compute capabilities. Other types and forms of network access (e.g., Wi-Fi, long-range wireless, wired networks including optical networks) may also be utilized in place of or in combination with such 3GPP carrier networks.

The network components of the edge cloud 910 may be servers, multi-tenant servers, appliance computing devices, or any other type of computing devices. For example, the edge cloud 910 may include an appliance computing device that is a self-contained electronic device including a housing, a chassis, a case or a shell. In some circumstances, the housing may be dimensioned for portability such that it can be carried by a human or shipped. Example housings may include materials that form one or more exterior surfaces that partially or fully protect contents of the appliance, in which protection may include weather protection, hazardous environment protection (e.g., EMI, vibration, extreme temperatures), or enable submergibility. Example housings may include power circuitry to provide power for stationary or portable implementations, such as AC power inputs, DC power inputs, AC/DC or DC/AC converter(s), power regulators, transformers, charging circuitry, batteries, wired inputs or wireless power inputs. Example housings or surfaces thereof may include or connect to mounting hardware to enable attachment to structures such as buildings, telecommunication structures (e.g., poles, antenna structures, etc.) or racks (e.g., server racks, blade mounts, etc.). Example housings or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface or mounted to the surface of the appliance. Example housings or surfaces thereof may support mechanical connectivity, such as propulsion hardware (e.g., wheels, propellers, etc.) or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein or attached thereto. Output devices may include displays, touchscreens, lights, LEDs, speakers, I/O ports (e.g., USB), etc. In some circumstances, edge devices are devices presented in the network for a specific purpose (e.g., a traffic light), but may have processing or other capacities that may be utilized for other purposes. Such edge devices may be independent from other networked devices and may be provided with a housing having a form factor suitable for its primary purpose; yet be available for other compute tasks that do not interfere with its primary task. Edge devices include Internet of Things devices. The appliance computing device may include hardware and software components to manage local issues such as device temperature, vibration, resource utilization, updates, power issues, physical and network security, etc. Example hardware for implementing an appliance computing device is described in conjunction with FIG. 14B. The edge cloud 910 may also include one or more servers or one or more multi-tenant servers. Such a server may include an operating system and implement a virtual computing environment. A virtual computing environment may include a hypervisor managing (e.g., spawning, deploying, destroying, etc.) one or more virtual machines, one or more containers, etc. Such virtual computing environments provide an execution environment in which one or more applications or other software, code or scripts may execute while being isolated from one or more other applications, software, code or scripts.

Figure 11:
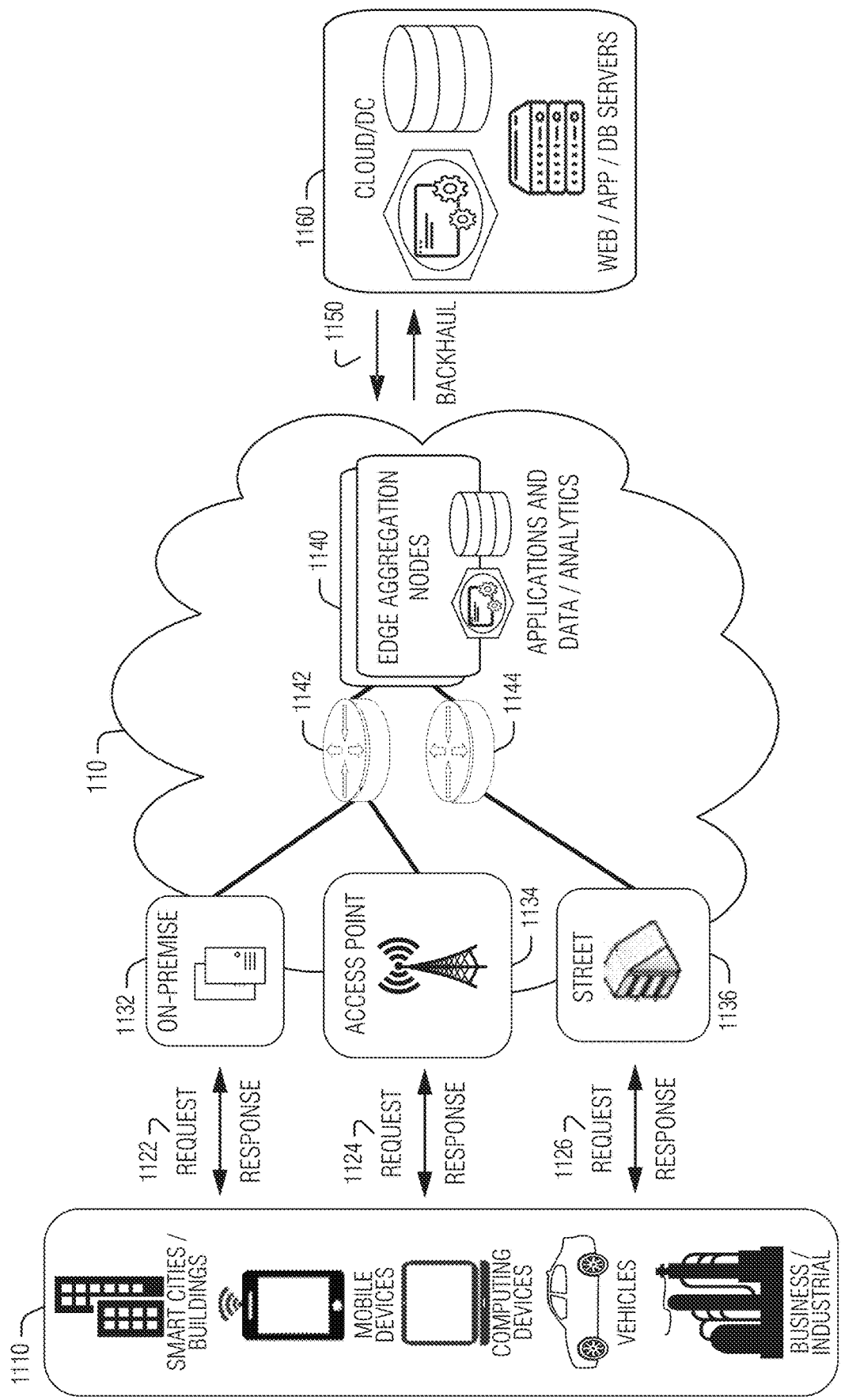
FIG. 11 illustrates an example approach for networking and services in an edge computing system.

In FIG. 11, various client endpoints 1110 (in the form of mobile devices, computers, autonomous vehicles, business computing equipment, industrial processing equipment) exchange requests and responses that are specific to the type of endpoint network aggregation. For instance, client endpoints 1110 may obtain network access via a wired broadband network, by exchanging requests and responses 1122 through an on-premise network system 1132. Some client endpoints 1110, such as mobile computing devices, may obtain network access via a wireless broadband network, by exchanging requests and responses 1124 through an access point (e.g., cellular network tower) 1134. Some client endpoints 1110, such as autonomous vehicles may obtain network access for requests and responses 1126 via a wireless vehicular network through a street-located network system 1136. However, regardless of the type of network access, the TSP may deploy aggregation points 1142, 1144 within the edge cloud 910 to aggregate traffic and requests. Thus, within the edge cloud 910, the TSP may deploy various compute and storage resources, such as at edge aggregation nodes 1140, to provide requested content. The edge aggregation nodes 1140 and other systems of the edge cloud 910 are connected to a cloud or data center 1160, which uses a backhaul network 1150 to fulfill higher-latency requests from a cloud/data center for websites, applications, database servers, etc. Additional or consolidated instances of the edge aggregation nodes 1140 and the aggregation points 1142, 1144, including those deployed on a single server framework, may also be present within the edge cloud 910 or other areas of the TSP infrastructure.

Figure 12:
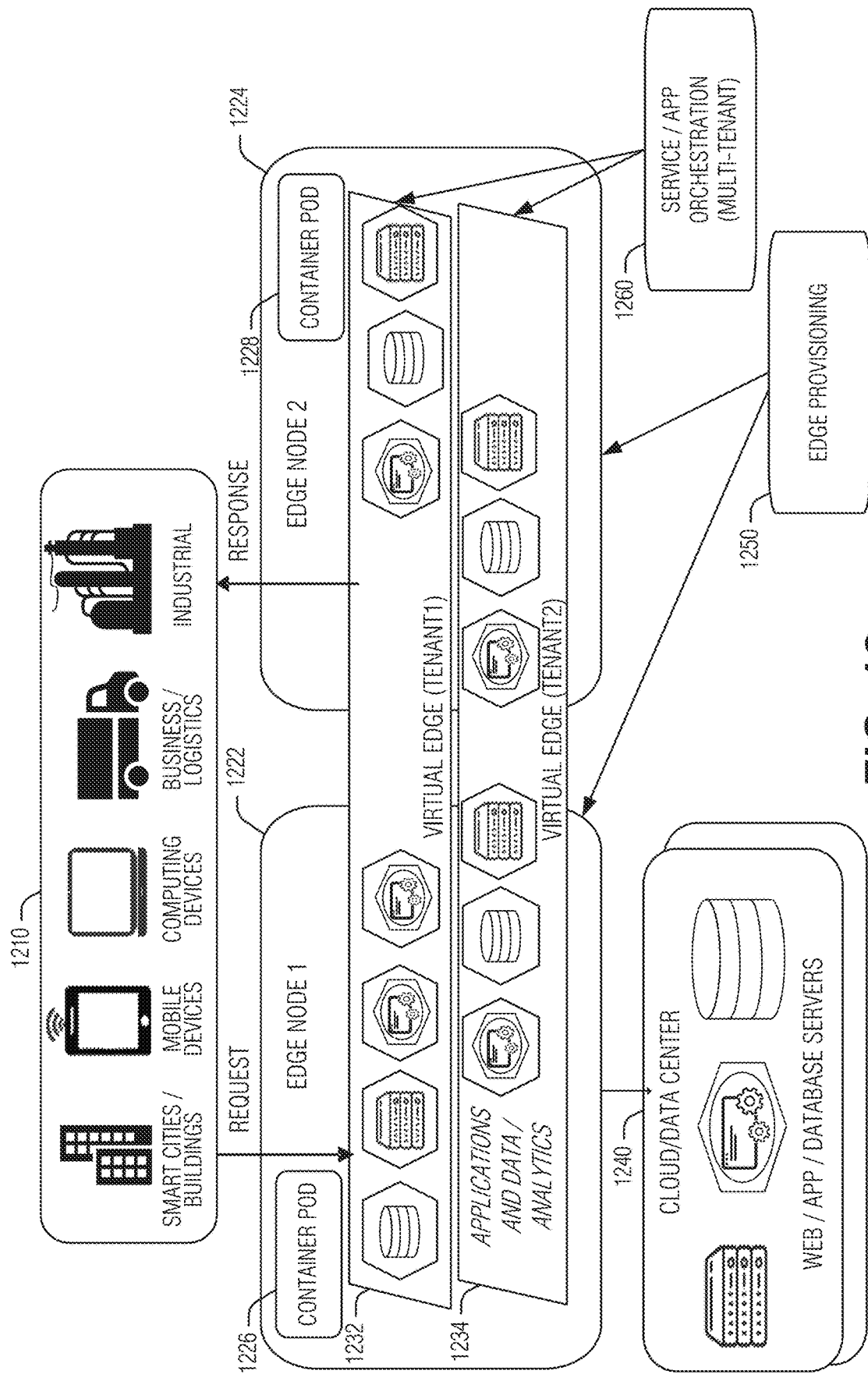
FIG. 12 illustrates deployment of a virtual edge configuration in an edge computing system operated among multiple edge nodes and multiple tenants.

FIG. 12 illustrates deployment and orchestration for virtualized and container-based edge configurations across an edge computing system operated among multiple edge nodes and multiple tenants (e.g., users, providers) which use such edge nodes. Specifically, FIG. 12 depicts coordination of a first edge node 1222 and a second edge node 1224 in an edge computing system, to fulfill requests and responses for various client endpoints 1210 (e.g., smart cities/building systems, mobile devices, computing devices, business/logistics systems, industrial systems, etc.), which access various virtual edge instances. Here, the virtual edge instances 1232, 1234 provide edge compute capabilities and processing in an edge cloud, with access to a cloud/data center 1240 for higher-latency requests for websites, applications, database servers, etc. However, the edge cloud enables coordination of processing among multiple edge nodes for multiple tenants or entities.

In the example of FIG. 12, these virtual edge instances include: a first virtual edge 1232, offered to a first tenant (Tenant 1), which offers a first combination of edge storage, computing, and services; and a second virtual edge 1234, offering a second combination of edge storage, computing, and services. The virtual edge instances 1232, 1234 are distributed among the edge nodes 1222, 1224, and may include scenarios in which a request and response are fulfilled from the same or different edge nodes. The configuration of the edge nodes 1222, 1224 to operate in a distributed yet coordinated fashion occurs based on edge provisioning functions 1250. The functionality of the edge nodes 1222, 1224 to provide coordinated operation for applications and services, among multiple tenants, occurs based on orchestration functions 1260.

It should be understood that some of the devices in 1210 are multi-tenant devices where Tenant 1 may function within a tenant1 'slice' while a Tenant 2 may function within a tenant2 slice (and, in further examples, additional or sub-tenants may exist; and each tenant may even be specifically entitled and transactionally tied to a specific set of features all the way day to specific hardware features). A trusted multi-tenant device may further contain a tenant specific cryptographic key such that the combination of key and slice may be considered a "root of trust" (RoT) or tenant specific RoT. A RoT may further be computed dynamically composed using a DICE (Device Identity Composition Engine) architecture such that a single DICE hardware building block may be used to construct layered trusted computing base contexts for layering of device capabilities (such as a Field Programmable Gate Array (FPGA)). The RoT may further be used for a trusted computing context to enable a "fan-out" that is useful for supporting multi-tenancy. Within a multi-tenant environment, the respective edge nodes 1222, 1224 may operate as security feature enforcement points for local resources allocated to multiple tenants per node. Additionally, tenant runtime and application execution (e.g., in instances 1232, 1234) may serve as an enforcement point for a security feature that creates a virtual edge abstraction of resources spanning potentially multiple physical hosting platforms. Finally, the orchestration functions 1260 at an orchestration entity may operate as a security feature enforcement point for marshalling resources along tenant boundaries.

Edge computing nodes may partition resources (memory, central processing unit (CPU), graphics processing unit (GPU), interrupt controller, input/output (I/O) controller, memory controller, bus controller, etc.) where respective partitionings may contain a RoT capability and where fan-out and layering according to a DICE model may further be applied to Edge Nodes. Cloud computing nodes often use containers, FaaS engines, Servlets, servers, or other computation abstraction that may be partitioned according to a DICE layering and fan-out structure to support a RoT context for each. Accordingly, the respective RoTs spanning devices 1210, 1222, and 1240 may coordinate the establishment of a distributed trusted computing base (DTCB) such that a tenant-specific virtual trusted secure channel linking all elements end to end can be established.

Further, it will be understood that a container may have data or workload specific keys protecting its content from a previous edge node. As part of migration of a container, a pod controller at a source edge node may obtain a migration key from a target edge node pod controller where the migration key is used to wrap the container-specific keys. When the container/pod is migrated to the target edge node, the unwrapping key is exposed to the pod controller that then decrypts the wrapped keys. The keys may now be used to perform operations on container specific data. The migration functions may be gated by properly attested edge nodes and pod managers (as described above).

In further examples, an edge computing system is extended to provide for orchestration of multiple applications through the use of containers (a contained, deployable unit of software that provides code and needed dependencies) in a multi-owner, multi-tenant environment. A multi-tenant orchestrator may be used to perform key management, trust anchor management, and other security functions related to the provisioning and lifecycle of the trusted 'slice' concept in FIG. 12. For instance, an edge computing system may be configured to fulfill requests and responses for various client endpoints from multiple virtual edge instances (and, from a cloud or remote data center). The use of these virtual edge instances may support multiple tenants and multiple applications (e.g., augmented reality (AR)/virtual reality (VR), enterprise applications, content delivery, gaming, compute offload) simultaneously. Further, there may be multiple types of applications within the virtual edge instances (e.g., normal applications; latency sensitive applications; latency-critical applications; user plane applications; networking applications; etc.). The virtual edge instances may also be spanned across systems of multiple owners at different geographic locations (or, respective computing systems and resources which are co-owned or co-managed by multiple owners).

For instance, each edge node 1222, 1224 may implement the use of containers, such as with the use of a container "pod" 1226, 1228 providing a group of one or more containers. In a setting that uses one or more container pods, a pod controller or orchestrator is responsible for local control and orchestration of the containers in the pod. Various edge node resources (e.g., storage, compute, services, depicted with hexagons) provided for the respective edge slices 1232, 1234 are partitioned according to the needs of each container.

With the use of container pods, a pod controller oversees the partitioning and allocation of containers and resources. The pod controller receives instructions from an orchestrator (e.g., orchestrator 1260) that instructs the controller on how best to partition physical resources and for what duration, such as by receiving key performance indicator (KPI) targets based on SLA contracts. The pod controller determines which container requires which resources and for how long in order to complete the workload and satisfy the SLA. The pod controller also manages container lifecycle operations such as: creating the container, provisioning it with resources and applications, coordinating intermediate results between multiple containers working on a distributed application together, dismantling containers when workload completes, and the like. Additionally, a pod controller may serve a security role that prevents assignment of resources until the right tenant authenticates or prevents provisioning of data or a workload to a container until an attestation result is satisfied.

Also, with the use of container pods, tenant boundaries can still exist but in the context of each pod of containers. If each tenant specific pod has a tenant specific pod controller, there will be a shared pod controller that consolidates resource allocation requests to avoid typical resource starvation situations. Further controls may be provided to ensure attestation and trustworthiness of the pod and pod controller. For instance, the orchestrator 1260 may provision an attestation verification policy to local pod controllers that perform attestation verification. If an attestation satisfies a policy for a first tenant pod controller but not a second tenant pod controller, then the second pod could be migrated to a different edge node that does satisfy it. Alternatively, the first pod may be allowed to execute and a different shared pod controller is installed and invoked prior to the second pod executing.

Figure 13:
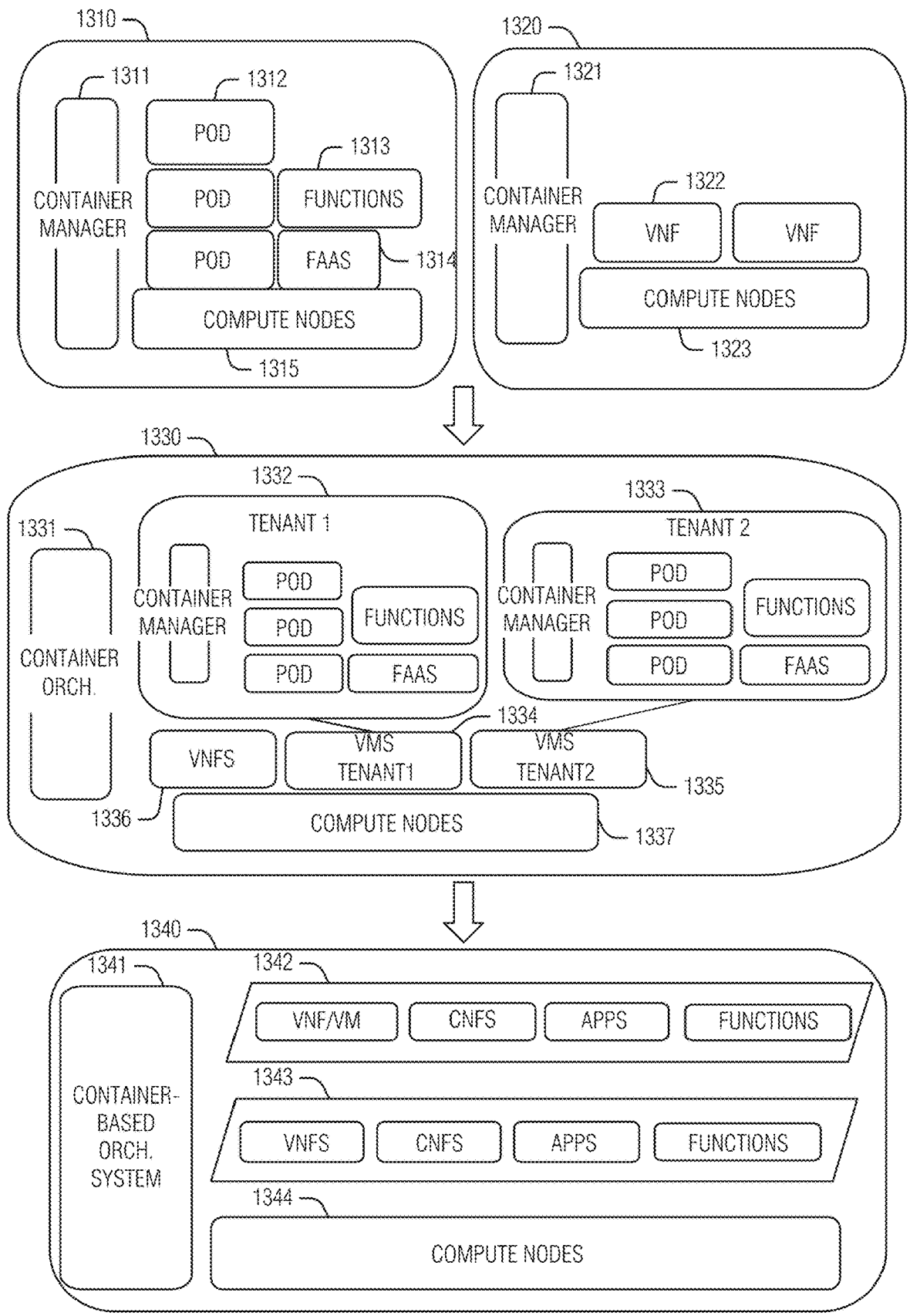
FIG. 13 illustrates various compute arrangements deploying containers in an edge computing system.

FIG. 13 illustrates additional compute arrangements deploying containers in an edge computing system. As a simplified example, system arrangements 1310, 1320 depict settings in which a pod controller (e.g., container managers 1311, 1321, and container orchestrator 1331) is adapted to launch containerized pods, functions, and functions-as-a-service instances through execution via compute nodes (1315 in arrangement 1310), or to separately execute containerized virtualized network functions through execution via compute nodes (1323 in arrangement 1320). This arrangement is adapted for use of multiple tenants in system arrangement 1330 (using compute nodes 1337), where containerized pods (e.g., pods 1312), functions (e.g., functions 1313, VNFs 1322, 1336), and functions-as-a-service instances (e.g., FaaS instance 1314) are launched within virtual machines (e.g., VMs 1334, 1335 for tenants 1332, 1333) specific to respective tenants (aside the execution of virtualized network functions). This arrangement is further adapted for use in system arrangement 1340, which provides containers 1342, 1343, or execution of the various functions, applications, and functions on compute nodes 1344, as coordinated by an container-based orchestration system 1341.

The system arrangements of depicted in FIG. 13 provides an architecture that treats VMs, Containers, and Functions equally in terms of application composition (and resulting applications are combinations of these three ingredients). Each ingredient may involve use of one or more accelerator (FPGA, ASIC) components as a local backend. In this manner, applications can be split across multiple edge owners, coordinated by an orchestrator.

In the context of FIG. 13, the pod controller/container manager, container orchestrator, and individual nodes may provide a security enforcement point. However, tenant isolation may be orchestrated where the resources allocated to a tenant are distinct from resources allocated to a second tenant, but edge owners cooperate to ensure resource allocations are not shared across tenant boundaries. Or, resource allocations could be isolated across tenant boundaries, as tenants could allow "use" via a subscription or transaction/contract basis. In these contexts, virtualization, containerization, enclaves and hardware partitioning schemes may be used by edge owners to enforce tenancy. Other isolation environments may include: bare metal (dedicated) equipment, virtual machines, containers, virtual machines on containers, or combinations thereof.

In further examples, aspects of software-defined or controlled silicon hardware, and other configurable hardware, may integrate with the applications, functions, and services an edge computing system. Software defined silicon (SDSi) may be used to ensure the ability for some resource or hardware ingredient to fulfill a contract or service level agreement, based on the ingredient's ability to remediate a portion of itself or the workload (e.g., by an upgrade, reconfiguration, or provision of new features within the hardware configuration itself).

In further examples, any of the compute nodes or devices discussed with reference to the present edge computing systems and environment may be fulfilled based on the components depicted in FIGS. 14A and 14B. Respective edge compute nodes may be embodied as a type of device, appliance, computer, or other "thing" capable of communicating with other edge, networking, or endpoint components. For example, an edge compute device may be embodied as a personal computer, server, smartphone, a mobile compute device, a smart appliance, an in-vehicle compute system (e.g., a navigation system), a self-contained device having an outer case, shell, etc., or other device or system capable of performing the described functions.

Figure 14A:
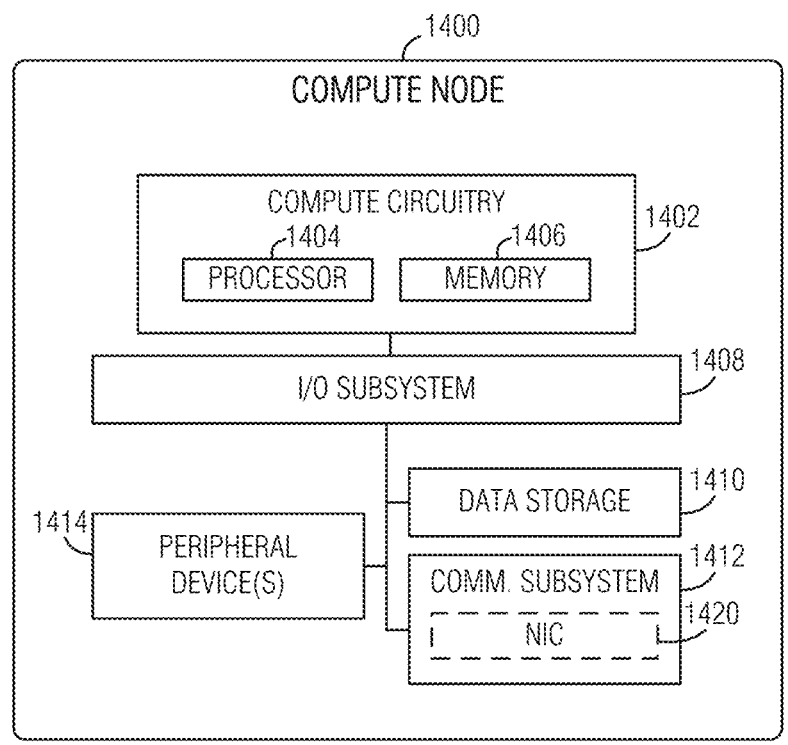
FIG. 14A provides an overview of example components for compute deployed at a compute node in an edge computing system.

In the simplified example depicted in FIG. 14A, an edge compute node 1400 includes a compute engine (also referred to herein as "compute circuitry") 1402, an input/output (I/O) subsystem 1408, data storage 1410, a communication circuitry subsystem 1412, and, optionally, one or more peripheral devices 1414. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1400 may be embodied as any type of engine, device, or collection of devices capable of performing various compute functions. In some examples, the compute node 1400 may be embodied as a single device such as an integrated circuit, an embedded system, a field-programmable gate array (FPGA), a system-on-a-chip (SOC), or other integrated system or device. In the illustrative example, the compute node 1400 includes or is embodied as a processor 1404 and a memory 1406. The processor 1404 may be embodied as any type of processor capable of performing the functions described herein (e.g., executing an application). For example, the processor 1404 may be embodied as a multi-core processor(s), a microcontroller, a processing unit, a specialized or special purpose processing unit, or other processor or processing/controlling circuit.

In some examples, the processor 1404 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1404 may be embodied as a specialized x-processing unit (xPU) also known as a data processing unit (DPU), infrastructure processing unit (LPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1404 may work in coordination with each other to execute many types of operations and instructions within and on behalf of the compute node 1400.

The memory 1406 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1406 may be integrated into the processor 1404. The memory 1406 may store various software and data used during operation such as one or more applications, data operated on by the application(s), libraries, and drivers.

The compute circuitry 1402 is communicatively coupled to other components of the compute node 1400 via the I/O subsystem 1408, which may be embodied as circuitry or components to facilitate input/output operations with the compute circuitry 1402 (e.g., with the processor 1404 or the main memory 1406) and other components of the compute circuitry 1402. For example, the I/O subsystem 1408 may be embodied as, or otherwise include, memory controller hubs, input/output control hubs, integrated sensor hubs, firmware devices, communication links (e.g., point-to-point links, bus links, wires, cables, light guides, printed circuit board traces, etc.), or other components and subsystems to facilitate the input/output operations. In some examples, the I/O subsystem 1408 may form a portion of a system-on-a-chip (SoC) and be incorporated, along with one or more of the processor 1404, the memory 1406, and other components of the compute circuitry 1402, into the compute circuitry 1402.

The one or more illustrative data storage devices 1410 may be embodied as any type of devices configured for short-term or long-term storage of data such as, for example, memory devices and circuits, memory cards, hard disk drives, solid-state drives, or other data storage devices. Individual data storage devices 1410 may include a system partition that stores data and firmware code for the data storage device 1410. Individual data storage devices 1410 may also include one or more operating system partitions that store data files and executables for operating systems depending on, for example, the type of compute node 1400.

The communication circuitry 1412 may be embodied as any communication circuit, device, or collection thereof, capable of enabling communications over a network between the compute circuitry 1402 and another compute device (e.g., an edge gateway of an implementing edge computing system). The communication circuitry 1412 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1412 includes a network interface controller (NIC) 1420, which may also be referred to as a host fabric interface (HFI). The NIC 1420 may be embodied as one or more add-in-boards, daughter cards, network interface cards, controller chips, chipsets, or other devices that may be used by the compute node 1400 to connect with another compute device (e.g., an edge gateway node). In some examples, the NIC 1420 may be embodied as part of a system-on-a-chip (SoC) that includes one or more processors, or included on a multichip package that also contains one or more processors. In some examples, the NIC 1420 may include a local processor (not shown) or a local memory (not shown) that are both local to the NIC 1420. In such examples, the local processor of the NIC 1420 may be capable of performing one or more of the functions of the compute circuitry 1402 described herein. Additionally, or alternatively, in such examples, the local memory of the NIC 1420 may be integrated into one or more components of the client compute node at the board level, socket level, chip level, or other levels.

Additionally, in some examples, a respective compute node 1400 may include one or more peripheral devices 1414. Such peripheral devices 1414 may include any type of peripheral device found in a compute device or server such as audio input devices, a display, other input/output devices, interface devices, or other peripheral devices, depending on the particular type of the compute node 1400. In further examples, the compute node 1400 may be embodied by a respective edge compute node (whether a client, gateway, or aggregation node) in an edge computing system or like forms of appliances, computers, subsystems, circuitry, or other components.

Figure 14B:
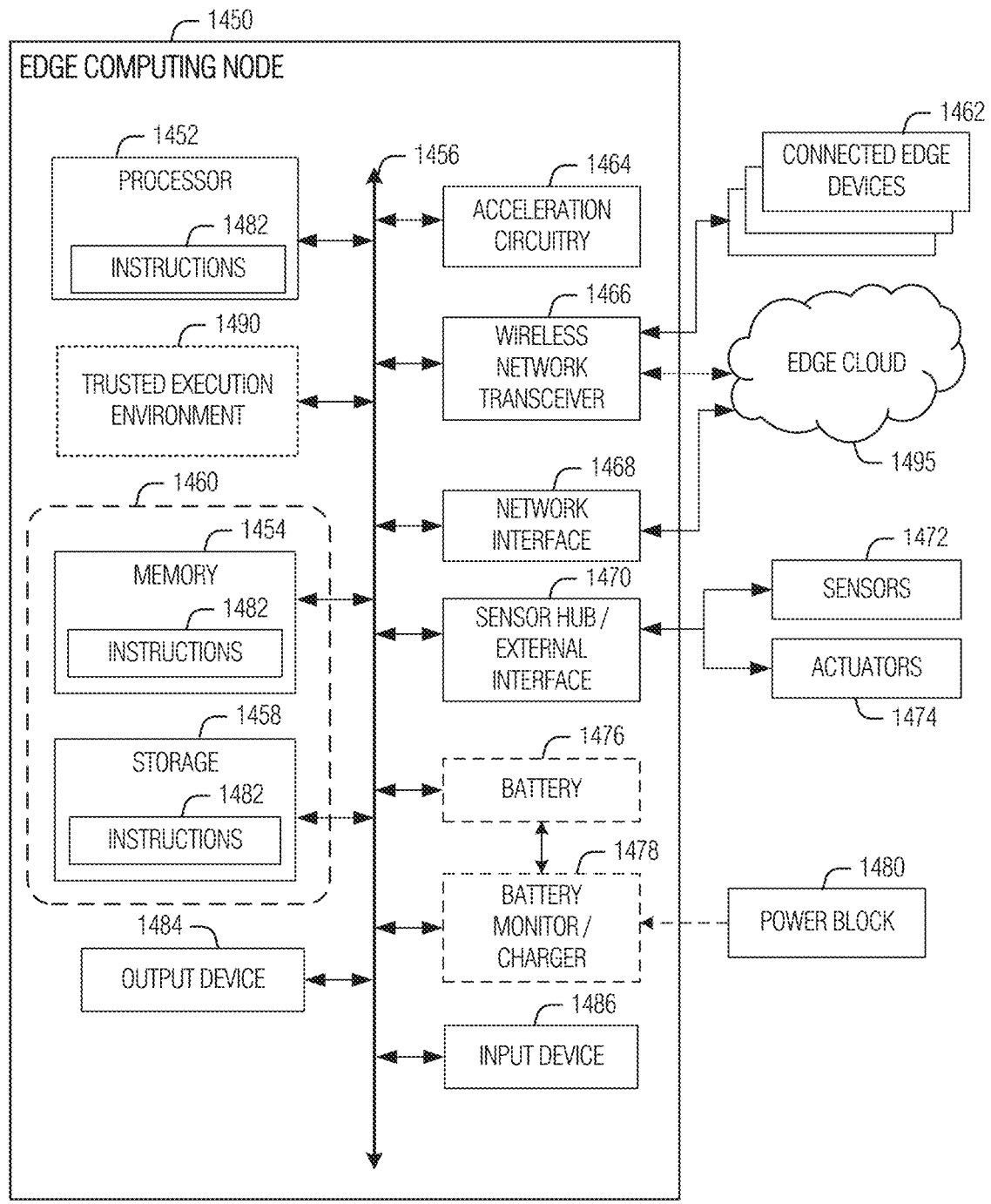
FIG. 14B provides a further overview of example components within a computing device in an edge computing system.

In a more detailed example, FIG. 14B illustrates a block diagram of an example of components that may be present in an edge computing node 1450 for implementing the techniques (e.g., operations, processes, methods, and methodologies) described herein. This edge computing node 1450 provides a closer view of the respective components of node 1400 when implemented as or as part of a computing device (e.g., as a mobile device, a base station, server, gateway, etc.). The edge computing node 1450 may include any combinations of the hardware or logical components referenced herein, and it may include or couple with any device usable with an edge communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the edge computing node 1450, or as components otherwise incorporated within a chassis of a larger system.

The edge computing device 1450 may include processing circuitry in the form of a processor 1452, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1452 may be a part of a system on a chip (SoC) in which the processor 1452 and other components are formed into a single integrated circuit, or a single package, such as the Edison™ or Galileo™ SoC boards from Intel Corporation, Santa Clara, California. As an example, the processor 1452 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1452 and accompanying circuitry may be provided in a single socket form factor, multiple socket form factor, or a variety of other formats, including in limited hardware configurations or configurations that include fewer than all elements shown in FIG. 14B.

The processor 1452 may communicate with a system memory 1454 over an interconnect 1456 (e.g., a bus). Any number of memory devices may be used to provide for a given amount of system memory. As examples, the memory 1454 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1458 may also couple to the processor 1452 via the interconnect 1456. In an example, the storage 1458 may be implemented via a solid-state disk drive (SSDD). Other devices that may be used for the storage 1458 include flash memory cards, such as Secure Digital (SD) cards, microSD cards, eXtreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1458 may be on-die memory or registers associated with the processor 1452. However, in some examples, the storage 1458 may be implemented using a micro hard disk drive (HDD). Further, any number of new technologies may be used for the storage 1458 in addition to, or instead of, the technologies described, such resistance change memories, phase change memories, holographic memories, or chemical memories, among others.

The components may communicate over the interconnect 1456. The interconnect 1456 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1456 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1456 may couple the processor 1452 to a transceiver 1466, for communications with the connected edge devices 1462. The transceiver 1466 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected edge devices 1462. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1466 (or multiple transceivers) may communicate using multiple standards or radios for communications at a different range. For example, the edge computing node 1450 may communicate with close devices, e.g., within about 10 meters, using a local transceiver based on Bluetooth Low Energy (BLE), or another low power radio, to save power. More distant connected edge devices 1462, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1466 (e.g., a radio transceiver) may be included to communicate with devices or services in a cloud (e.g., an edge cloud 1495) via local or wide area network protocols. The wireless network transceiver 1466 may be a low-power wide-area (LPWA) transceiver that follows the IEEE 802.15.4, or IEEE 802.15.4g standards, among others. The edge computing node 1450 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1466, as described herein. For example, the transceiver 1466 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1466 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1468 may be included to provide a wired communication to nodes of the edge cloud 1495 or to other devices, such as the connected edge devices 1462 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1468 may be included to enable connecting to a second network, for example, a first NIC 1468 providing communications to the cloud over Ethernet, and a second NIC 1468 providing communications to other devices over another type of network.

Given the variety of types of applicable communications from the device to another component or network, applicable communications circuitry used by the device may include or be embodied by any one or more of components 1464, 1466, 1468, or 1470. Accordingly, in various examples, applicable means for communicating (e.g., receiving, transmitting, etc.) may be embodied by such communications circuitry.

The edge computing node 1450 may include or be coupled to acceleration circuitry 1464, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific edge computing tasks for service management and service operations discussed elsewhere in this document.

The interconnect 1456 may couple the processor 1452 to a sensor hub or external interface 1470 that is used to connect additional devices or subsystems. The devices may include sensors 1472, such as accelerometers, level sensors, flow sensors, optical light sensors, camera sensors, temperature sensors, global navigation system (e.g., GPS) sensors, pressure sensors, barometric pressure sensors, and the like.

The hub or interface 1470 further may be used to connect the edge computing node 1450 to actuators 1474, such as power switches, valve actuators, an audible sound generator, a visual warning device, and the like.

In some optional examples, various input/output (I/O) devices may be present within or connected to, the edge computing node 1450. For example, a display or other output device 1484 may be included to show information, such as sensor readings or actuator position. An input device 1486, such as a touch screen or keypad may be included to accept input. An output device 1484 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the edge computing node 1450. A display or console hardware, in the context of the present system, may be used to provide output and receive input of an edge computing system; to manage components or services of an edge computing system; identify a state of an edge computing component or service; or to conduct any other number of management or administration functions or service use cases.

A battery 1476 may power the edge computing node 1450, although, in examples in which the edge computing node 1450 is mounted in a fixed location, it may have a power supply coupled to an electrical grid, or the battery may be used as a backup or for temporary capabilities. The battery 1476 may be a lithium ion battery, or a metal-air battery, such as a zinc-air battery, an aluminum-air battery, a lithium-air battery, and the like.

A battery monitor/charger 1478 may be included in the edge computing node 1450 to track the state of charge (SoCh) of the battery 1476, if included. The battery monitor/charger 1478 may be used to monitor other parameters of the battery 1476 to provide failure predictions, such as the state of health (SoH) and the state of function (SoF) of the battery 1476. The battery monitor/charger 1478 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX The battery monitor/charger 1478 may communicate the information on the battery 1476 to the processor 1452 over the interconnect 1456. The battery monitor/charger 1478 may also include an analog-to-digital (ADC) converter that enables the processor 1452 to directly monitor the voltage of the battery 1476 or the current flow from the battery 1476. The battery parameters may be used to determine actions that the edge computing node 1450 may perform, such as transmission frequency, mesh network operation, sensing frequency, and the like.

A power block 1480, or other power supply coupled to a grid, may be coupled with the battery monitor/charger 1478 to charge the battery 1476. In some examples, the power block 1480 may be replaced with a wireless power receiver to obtain the power wirelessly, for example, through a loop antenna in the edge computing node 1450. A wireless battery charging circuit, such as an LTC4020 chip from Linear Technologies of Milpitas, California, among others, may be included in the battery monitor/charger 1478. The specific charging circuits may be selected based on the size of the battery 1476, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1458 may include instructions 1482 in the form of software, firmware, or hardware commands to implement the techniques described herein. Although such instructions 1482 are shown as code blocks included in the memory 1454 and the storage 1458, it may be understood that any of the code blocks may be replaced with hardwired circuits, for example, built into an application specific integrated circuit (ASIC).

In an example, the instructions 1482 provided via the memory 1454, the storage 1458, or the processor 1452 may be embodied as a non-transitory, machine-readable medium 1460 including code to direct the processor 1452 to perform electronic operations in the edge computing node 1450. The processor 1452 may access the non-transitory, machine-readable medium 1460 over the interconnect 1456. For instance, the non-transitory, machine-readable medium 1460 may be embodied by devices described for the storage 1458 or may include specific storage units such as optical disks, flash drives, or any number of other hardware devices. The non-transitory, machine-readable medium 1460 may include instructions to direct the processor 1452 to perform a specific sequence or flow of actions, for example, as described with respect to the flowchart(s) and block diagram(s) of operations and functionality depicted above. As used herein, the terms "machine-readable medium" and "computer-readable medium" are interchangeable. Also in a specific example, the instructions 1482 on the processor 1452 (separately, or in combination with the instructions 1482 of the machine readable medium 1460) may configure execution or operation of a trusted execution environment (TEE) 1490. In an example, the TEE 1490 operates as a protected area accessible to the processor 1452 for secure execution of instructions and secure access to data. Various implementations of the TEE 1490, and an accompanying secure area in the processor 1452 or the memory 1454 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the device 1450 through the TEE 1490 and the processor 1452.

Figure 15:
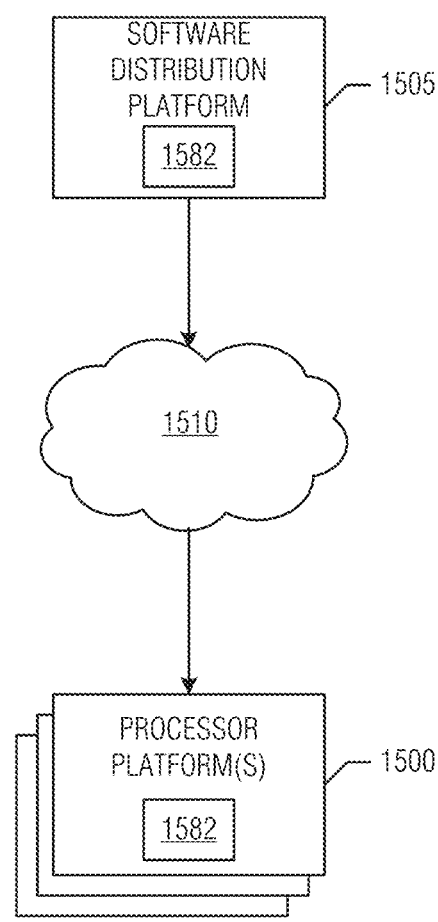
FIG. 15 illustrates an example software distribution platform to distribute software.

FIG. 15 illustrates an example software distribution platform 1505 to distribute software, such as the example computer readable instructions 1582 of FIG. 15, to one or more devices, such as example processor platform(s) 1500 or connected edge devices. The example software distribution platform 1505 may be implemented by any computer server, data facility, cloud service, etc., capable of storing and transmitting software to other computing devices (e.g., third parties, or connected edge devices). Example connected edge devices may be customers, clients, managing devices (e.g., servers), third parties (e.g., customers of an entity owning or operating the software distribution platform 1505). Example connected edge devices may operate in commercial or home automation environments. In some examples, a third party is a developer, a seller, or a licensor of software such as the example computer readable instructions 1582 of FIG. 15. The third parties may be consumers, users, retailers, OEMs, etc. that purchase or license the software for use or re-sale or sub-licensing. In some examples, distributed software causes display of one or more user interfaces (UIs) or graphical user interfaces (GUIs) to identify the one or more devices (e.g., connected edge devices) geographically or logically separated from each other (e.g., physically separated IoT devices chartered with the responsibility of water distribution control (e.g., pumps), electricity distribution control (e.g., relays), etc.).

In the illustrated example of FIG. 15, the software distribution platform 1505 includes one or more servers and one or more storage devices. The storage devices store the computer readable instructions 1582, which may correspond to the example computer readable instructions illustrated in the figures and described herein. The one or more servers of the example software distribution platform 1505 are in communication with a network 1510, which may correspond to any one or more of the Internet or any of the example networks described herein. In some examples, the one or more servers are responsive to requests to transmit the software to a requesting party as part of a commercial transaction. Payment for the delivery, sale or license of the software may be handled by the one or more servers of the software distribution platform or via a third-party payment entity. The servers enable purchasers or licensors to download the computer readable instructions 1582 from the software distribution platform 1505. For example, the software, which may correspond to the example computer readable instructions described herein, may be downloaded to the example processor platform(s) 1500 (e.g., example connected edge devices), which are to execute the computer readable instructions 1582 to implement the technique. In some examples, one or more servers of the software distribution platform 1505 are communicatively connected to one or more security domains or security devices through which requests and transmissions of the example computer readable instructions 1582 must pass. In some examples, one or more servers of the software distribution platform 1505 periodically offer, transmit, or force updates to the software (e.g., the example computer readable instructions 1582 of FIG. 15) to ensure improvements, patches, updates, etc. are distributed and applied to the software at the end user devices.

In the illustrated example of FIG. 15, the computer readable instructions 1582 are stored on storage devices of the software distribution platform 1505 in a particular format. A format of computer readable instructions includes, but is not limited to a particular code language (e.g., Java, JavaScript, Python, C, C#, SQL, HTML, etc.), or a particular code state (e.g., uncompiled code (e.g., ASCII), interpreted code, linked code, executable code (e.g., a binary), etc.). In some examples, the computer readable instructions 1582 stored in the software distribution platform 1505 are in a first format when transmitted to the example processor platform(s) 1500. In some examples, the first format is an executable binary in which particular types of the processor platform(s) 1500 can execute. However, in some examples, the first format is uncompiled code that requires one or more preparation tasks to transform the first format to a second format to enable execution on the example processor platform(s) 1500. For instance, the receiving processor platform(s) 1500 may need to compile the computer readable instructions 1582 in the first format to generate executable code in a second format that is capable of being executed on the processor platform(s) 1500. In still other examples, the first format is interpreted code that, upon reaching the processor platform(s) 1500, is interpreted by an interpreter to facilitate execution of instructions.

Figure 16:
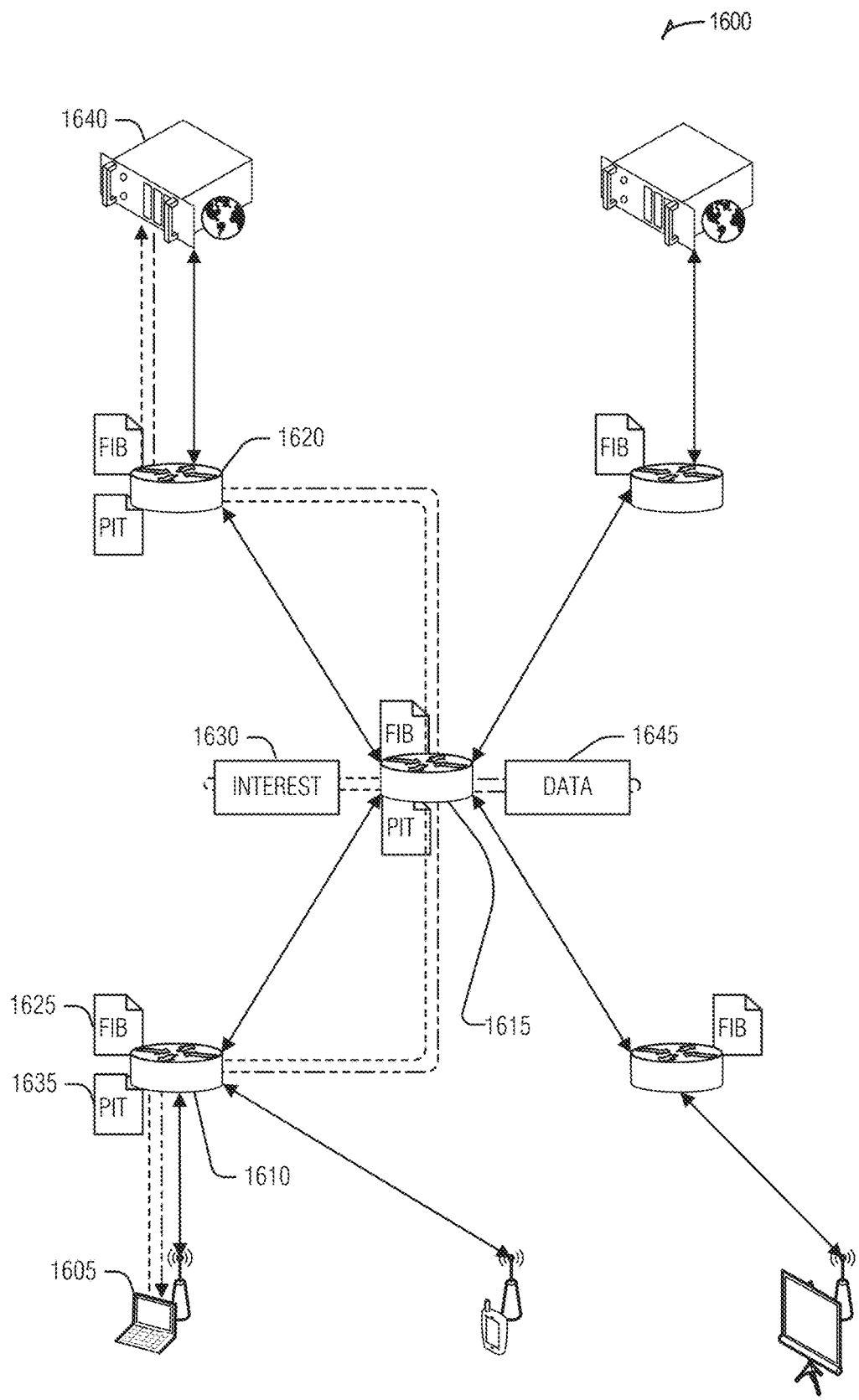
FIG. 16 illustrates an example information centric network (ICN).

FIG. 16 illustrates an example information centric network (ICN), according to an embodiment. ICNs operate differently than traditional host-based (e.g., address-based) communication networks. ICN is an umbrella term for a networking paradigm in which information and/or functions themselves are named and requested from the network instead of hosts (e.g., machines that provide information). In a host-based networking paradigm, such as used in the Internet protocol (IP), a device locates a host and requests content from the host. The network understands how to route (e.g., direct) packets based on the address specified in the packet. In contrast, ICN does not include a request for a particular machine and does not use addresses. Instead, to get content, a device 1605 (e.g., subscriber) requests named content from the network itself. The content request may be called an interest and transmitted via an interest packet 1630. As the interest packet traverses network devices (e.g., network elements, routers, switches, hubs, etc.)—such as network elements 1610, 1615, and 1620—a record of the interest is kept, for example, in a pending interest table (PIT) at each network element. Thus, network element 1610 maintains an entry in its PIT 1635 for the interest packet 1630, network element 1615 maintains the entry in its PIT, and network element 1620 maintains the entry in its PIT.

When a device, such as publisher 1640, that has content matching the name in the interest packet 1630 is encountered, that device 1640 may send a data packet 1645 in response to the interest packet 1630. Typically, the data packet 1645 is tracked back through the network to the source (e.g., device 1605) by following the traces of the interest packet 1630 left in the network element PITs. Thus, the PIT 1635 at each network element establishes a trail back to the subscriber 1605 for the data packet 1645 to follow.

Matching the named data in an ICN may follow several strategies. Generally, the data is named hierarchically, such as with a universal resource identifier (URI). For example, a video may be named www.somedomain.com or videos or v8675309. Here, the hierarchy may be seen as the publisher, "www.somedomain.com," a sub-category, "videos," and the canonical identification "v8675309." As an interest 1630 traverses the ICN, ICN network elements will generally attempt to match the name to a greatest degree. Thus, if an ICN element has a cached item or route for both "www.somedomain.com or videos" and "www.somedomain.com or videos or v8675309," the ICN element will match the later for an interest packet 1630 specifying "www.somedomain.com or videos or v8675309." In an example, an expression may be used in matching by the ICN device. For example, the interest packet may specify "www.somedomain.com or videos or v8675*" where '*' is a wildcard. Thus, any cached item or route that includes the data other than the wildcard will be matched.

Item matching involves matching the interest 1630 to data cached in the ICN element. Thus, for example, if the data 1645 named in the interest 1630 is cached in network element 1615, then the network element 1615 will return the data 1645 to the subscriber 1605 via the network element 1610. However, if the data 1645 is not cached at network element 1615, the network element 1615 routes the interest 1630 on (e.g., to network element 1620). To facilitate routing, the network elements may use a forwarding information base 1625 (FIB) to match named data to an interface (e.g., physical port) for the route. Thus, the FIB 1625 operates much like a routing table on a traditional network device.

In an example, additional meta-data may be attached to the interest packet 1630, the cached data, or the route (e.g., in the FIB 1625), to provide an additional level of matching. For example, the data name may be specified as "www.somedomain.com or videos or v8675309," but also include a version number—or timestamp, time range, endorsement, etc. In this example, the interest packet 1630 may specify the desired name, the version number, or the version range. The matching may then locate routes or cached data matching the name and perform the additional comparison of meta-data or the like to arrive at an ultimate decision as to whether data or a route matches the interest packet 1630 for respectively responding to the interest packet 1630 with the data packet 1645 or forwarding the interest packet 1630.

ICN has advantages over host-based networking because the data segments are individually named. This enables aggressive caching throughout the network as a network element may provide a data packet 1630 in response to an interest 1630 as easily as an original author 1640. Accordingly, it is less likely that the same segment of the network will transmit duplicates of the same data requested by different devices.

Fine grained encryption is another feature of many ICN networks. A typical data packet 1645 includes a name for the data that matches the name in the interest packet 1630. Further, the data packet 1645 includes the requested data and may include additional information to filter similarly named data (e.g., by creation time, expiration time, version, etc.). To address malicious entities providing false information under the same name, the data packet 1645 may also encrypt its contents with a publisher key or provide a cryptographic hash of the data and the name. Thus, knowing the key (e.g., from a certificate of an expected publisher 1640) enables the recipient to ascertain whether the data is from that publisher 1640. This technique also facilitates the aggressive caching of the data packets 1645 throughout the network because each data packet 1645 is self-contained and secure. In contrast, many host-based networks rely on encrypting a connection between two hosts to secure communications. This may increase latencies while connections are being established and prevents data caching by hiding the data from the network elements.

Example ICN networks include content centric networking (CCN), as specified in the Internet Engineering Task Force (IETF) draft specifications for CCNx 0.x and CCN 1.x, and named data networking (NDN), as specified in the NDN technical report DND-0001.

Figure 17:
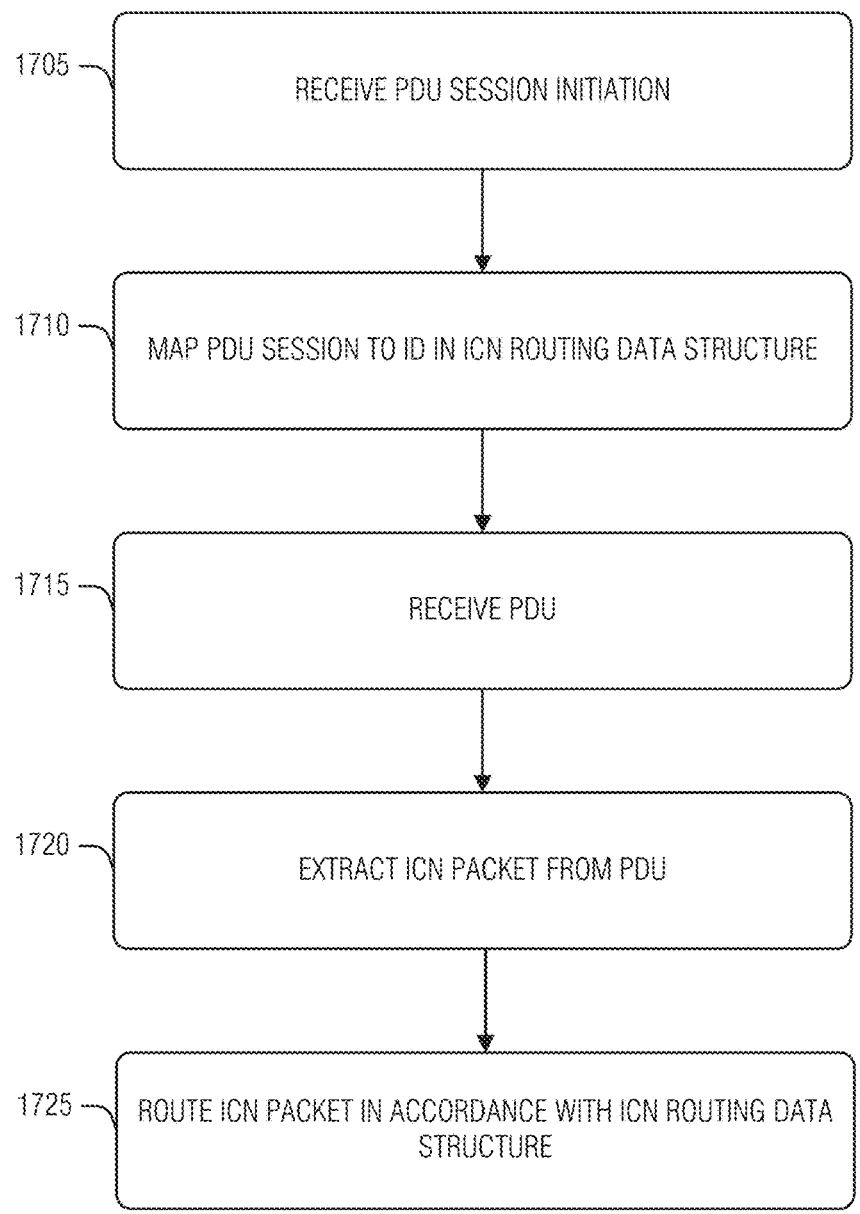
FIG. 17 illustrates a flow diagram of an example of a method for information centric network unstructured data carrier, according to an embodiment.

FIG. 17 illustrates a flow diagram of an example of a method 1700 for information centric network unstructured data carrier, according to an embodiment. The operations of the method 1700 are performed by computational hardware, such as that described above or below (e.g., processing circuitry).

At operation 1705, an initiation for a packet data unit (PDU) session of user equipment (UE) is received at a user plane function (UPF) node. Here, the initiation includes an indication for an ICN session and also includes a PDU session identification (ID). In an example, the initiation includes a packet data network (PDN) type that has a value of zero, six, or seven as the indication for the ICN session. In an example, the PDN type was used to select the UPF node from a second UPF node, the second UPF node lacking (e.g., missing) ICN processing capabilities. Thus, the PDN type enables an AMF to connect the PDU session to an ICN aware UPF and avoid connecting the PDU session to a UPF that will not handle ICN packets correctly.

At operation 1710, the PDU session is mapped to the PDU session ID in an ICN routing data structure. In an example, the ICN routing data structure is a pending interest table (PIT). In an example, the ICn routing data structure is a forwarding interest base (FIB).

At operation 1715, an ICN packet from the UE contained within a PDU on from the PDU session is received. Here, the ICN packet is an interest packet or a data packet. The PDU conforms to an unstructured-data classification as defined by a 3GPP 5G family of standards.

At operation 1720, the ICN packet is extracted from the PDU. In an example, the PDU session is carried on a general packet radio service (GPRS) tunneling protocol (GTP) tunnel. In an example, the PDU session ID is based on a tunnel endpoint identifier (TEID) for the GTP tunnel. In an example, extracting the ICN packet from the from the PDU includes removing a GTP tunnel header, a user data protocol (UDP) header, or outer internet protocol (IP) packet header. In an example, the GTP tunnel is an N3 tunnel between the UPF node and a gNodeB base station. In an example, the GTP tunnel is an N9 tunnel between the UPF node and an intermediate UPF node.

At operation 1725, the ICN packet is routed in accordance with the ICN routing data structure.

Figure 18:
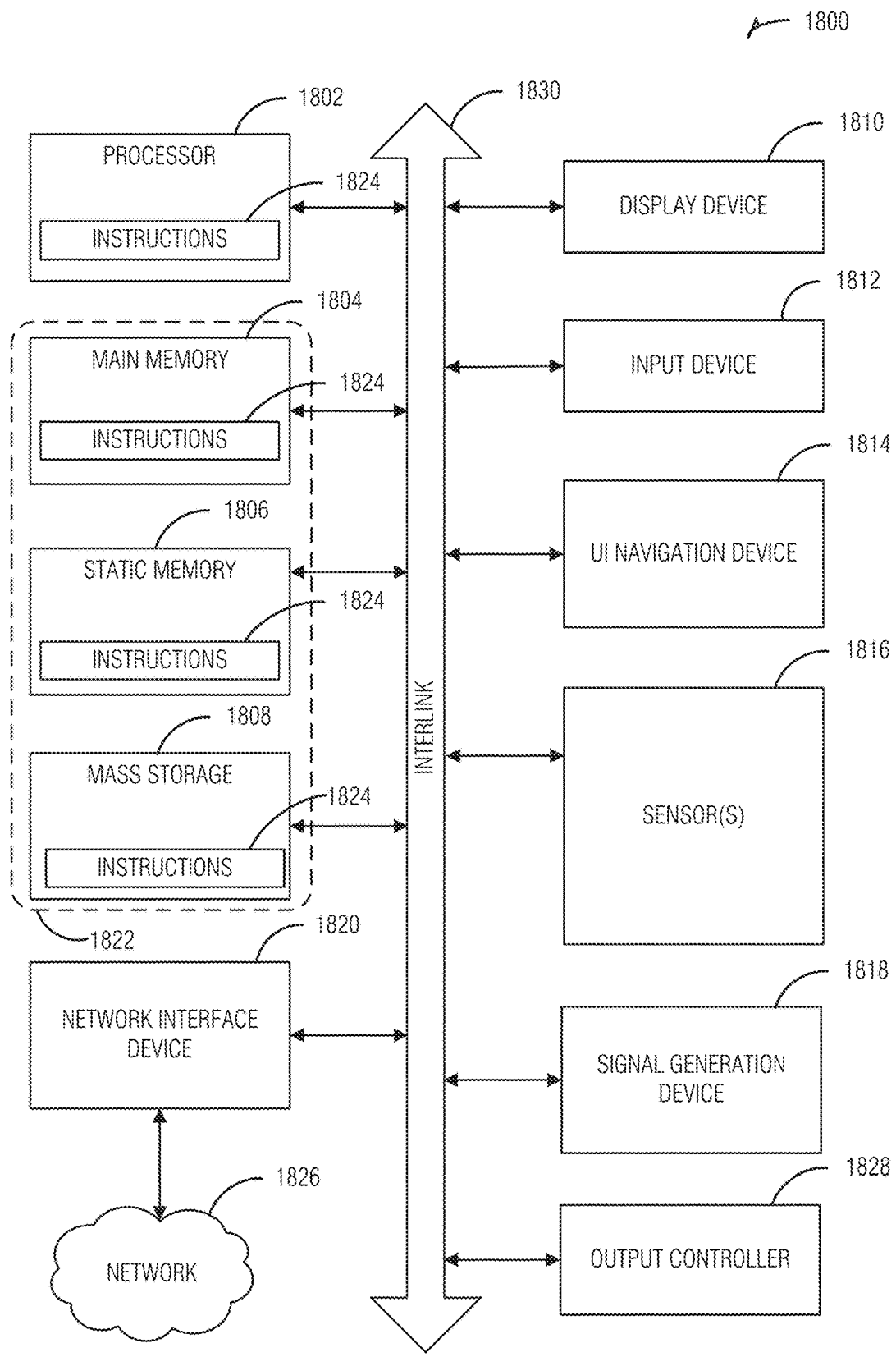
FIG. 18 is a block diagram illustrating an example of a machine upon which one or more embodiments may be implemented.

FIG. 18 illustrates a block diagram of an example machine 1800 upon which any one or more of the techniques (e.g., methodologies) discussed herein may perform. Examples, as described herein, may include, or may operate by, logic or a number of components, or mechanisms in the machine 1800. Circuitry (e.g., processing circuitry) is a collection of circuits implemented in tangible entities of the machine 1800 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1800 follow.

In alternative embodiments, the machine 1800 may operate as a standalone device or may be connected (e.g., networked) to other machines. In a networked deployment, the machine 1800 may operate in the capacity of a server machine, a client machine, or both in server-client network environments. In an example, the machine 1800 may act as a peer machine in peer-to-peer (P2P) (or other distributed) network environment. The machine 1800 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1800 may include a hardware processor 1802 (e.g., a central processing unit (CPU), a graphics processing unit (GPU), a hardware processor core, or any combination thereof), a main memory 1804, a static memory (e.g., memory or storage for firmware, microcode, a basic-input-output (BIOS), unified extensible firmware interface (UEFI), etc.) 1806, and mass storage 1808 (e.g., hard drives, tape drives, flash storage, or other block devices) some or all of which may communicate with each other via an interlink (e.g., bus) 1830. The machine 1800 may further include a display unit 1810, an alphanumeric input device 1812 (e.g., a keyboard), and a user interface (UI) navigation device 1814 (e.g., a mouse). In an example, the display unit 1810, input device 1812 and UI navigation device 1814 may be a touch screen display. The machine 1800 may additionally include a storage device (e.g., drive unit) 1808, a signal generation device 1818 (e.g., a speaker), a network interface device 1820, and one or more sensors 1816, such as a global positioning system (GPS) sensor, compass, accelerometer, or other sensor. The machine 1800 may include an output controller 1828, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1802, the main memory 1804, the static memory 1806, or the mass storage 1808 may be, or include, a machine readable medium 1822 on which is stored one or more sets of data structures or instructions 1824 (e.g., software) embodying or utilized by any one or more of the techniques or functions described herein. The instructions 1824 may also reside, completely or at least partially, within any of registers of the processor 1802, the main memory 1804, the static memory 1806, or the mass storage 1808 during execution thereof by the machine 1800. In an example, one or any combination of the hardware processor 1802, the main memory 1804, the static memory 1806, or the mass storage 1808 may constitute the machine readable media 1822. While the machine readable medium 1822 is illustrated as a single medium, the term "machine readable medium" may include a single medium or multiple media (e.g., a centralized or distributed database, or associated caches and servers) configured to store the one or more instructions 1824.

The term "machine readable medium" may include any medium that is capable of storing, encoding, or carrying instructions for execution by the machine 1800 and that cause the machine 1800 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

In an example, information stored or otherwise provided on the machine readable medium 1822 may be representative of the instructions 1824, such as instructions 1824 themselves or a format from which the instructions 1824 may be derived. This format from which the instructions 1824 may be derived may include source code, encoded instructions (e.g., in compressed or encrypted form), packaged instructions (e.g., split into multiple packages), or the like. The information representative of the instructions 1824 in the machine readable medium 1822 may be processed by processing circuitry into the instructions to implement any of the operations discussed herein. For example, deriving the instructions 1824 from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions 1824.

In an example, the derivation of the instructions 1824 may include assembly, compilation, or interpretation of the information (e.g., by the processing circuitry) to create the instructions 1824 from some intermediate or preprocessed format provided by the machine readable medium 1822. The information, when provided in multiple parts, may be combined, unpacked, and modified to create the instructions 1824. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable etc.) at a local machine, and executed by the local machine.

The instructions 1824 may be further transmitted or received over a communications network 1826 using a transmission medium via the network interface device 1820 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), LoRa/LoRaWAN, or satellite communication networks, mobile telephone networks (e.g., cellular networks such as those complying with 3G, 4G LTE/LTE-A, or 5G standards), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, peer-to-peer (P2P) networks, among others. In an example, the network interface device 1820 may include one or more physical jacks (e.g., Ethernet, coaxial, or phone jacks) or one or more antennas to connect to the communications network 1826. In an example, the network interface device 1820 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1800, and includes digital or analog communications signals or other intangible medium to facilitate communication of such software. A transmission medium is a machine readable medium.

ADDITIONAL NOTES & EXAMPLES

Example 1 is an apparatus for an information centric network (ICN) unstructured data carrier, the apparatus comprising: machine readable media including instructions; and processing circuitry that, when in operation, is configured by the instructions to: receive, at a user plane function (UPF) node, an initiation for a packet data unit (PDU) session of user equipment (UE), the initiation including an indication for an ICN session and a PDU session identification (ID); map the PDU session to the PDU session ID in an ICN routing data structure, the ICN routing data structure being a pending interest table (PIT) or a forwarding interest base (FIB); receive an ICN packet from the UE contained within a PDU on from the PDU session, the ICN packet being an interest packet or a data packet, the PDU conforming to an unstructured-data classification as defined by a third generation partnership project (3GPP) 5G family of standards; extract the ICN packet from the PDU; and route the ICN packet in accordance with the ICN routing data structure.

In Example 2, the subject matter of Example 1, wherein the initiation includes a packet data network (PDN) type that has a value of zero, six, or seven as the indication for the ICN session.

In Example 3, the subject matter of Example 2, wherein the PDN type was used to select the UPF node from a second UPF node, the second UPF node lacking ICN processing capabilities.

In Example 4, the subject matter of any of Examples 1-3, wherein the PDU session is carried on a general packet radio service (GPRS) tunneling protocol (GTP) tunnel.

In Example 5, the subject matter of Example 4, wherein the PDU session ID is based on a tunnel endpoint identifier (TEID) for the GTP tunnel.

In Example 6, the subject matter of any of Examples 4-5, wherein, to extract the ICN packet from the from the PDU, the processing circuitry is configured to remove a GTP tunnel header, a user data protocol (UDP) header, or outer internet protocol (IP) packet header.

In Example 7, the subject matter of any of Examples 4-6, wherein the GTP tunnel is an N3 tunnel between the UPF node and a gNodeB base station.

In Example 8, the subject matter of any of Examples 4-7, wherein the GTP tunnel is an N9 tunnel between the UPF node and an intermediate UPF node.

Example 9 is a method for an information centric network (ICN) unstructured data carrier, the method comprising: receiving, at a user plane function (UPF) node, an initiation for a packet data unit (PDU) session of user equipment (UE), the initiation including an indication for an ICN session and a PDU session identification (ID); mapping the PDU session to the PDU session ID in an ICN routing data structure, the ICN routing data structure being a pending interest table (PIT) or a forwarding interest base (FIB); receiving an ICN packet from the UE contained within a PDU on from the PDU session, the ICN packet being an interest packet or a data packet, the PDU conforming to an unstructured-data classification as defined by a third generation partnership project (3GPP) 5G family of standards; extracting the ICN packet from the PDU; and routing the ICN packet in accordance with the ICN routing data structure.

In Example 10, the subject matter of Example 9, wherein the initiation includes a packet data network (PDN) type that has a value of zero, six, or seven as the indication for the ICN session.

In Example 11, the subject matter of Example 10, wherein the PDN type was used to select the UPF node from a second UPF node, the second UPF node lacking ICN processing capabilities.

In Example 12, the subject matter of any of Examples 9-11, wherein the PDU session is carried on a general packet radio service (GPRS) tunneling protocol (GTP) tunnel.

In Example 13, the subject matter of Example 12, wherein the PDU session ID is based on a tunnel endpoint identifier (TEID) for the GTP tunnel.

In Example 14, the subject matter of any of Examples 12-13, wherein extracting the ICN packet from the from the PDU includes removing a GTP tunnel header, a user data protocol (UDP) header, or outer internet protocol (IP) packet header.

In Example 15, the subject matter of any of Examples 12-14, wherein the GTP tunnel is an N3 tunnel between the UPF node and a gNodeB base station.

In Example 16, the subject matter of any of Examples 12-15, wherein the GTP tunnel is an N9 tunnel between the UPF node and an intermediate UPF node.

Example 17 is at least one machine readable medium including instructions for an information centric network (ICN) unstructured data carrier, the instructions, when executed by processing circuitry, cause the processing circuitry to perform operations comprising: receiving, at a user plane function (UPF) node, an initiation for a packet data unit (PDU) session of user equipment (UE), the initiation including an indication for an ICN session and a PDU session identification (ID); mapping the PDU session to the PDU session ID in an ICN routing data structure, the ICN routing data structure being a pending interest table (PIT) or a forwarding interest base (FIB); receiving an ICN packet from the UE contained within a PDU on from the PDU session, the ICN packet being an interest packet or a data packet, the PDU conforming to an unstructured-data classification as defined by a third generation partnership project (3GPP) 5G family of standards; extracting the ICN packet from the PDU; and routing the ICN packet in accordance with the ICN routing data structure.

In Example 18, the subject matter of Example 17, wherein the initiation includes a packet data network (PDN) type that has a value of zero, six, or seven as the indication for the ICN session.

In Example 19, the subject matter of Example 18, wherein the PDN type was used to select the UPF node from a second UPF node, the second UPF node lacking ICN processing capabilities.

In Example 20, the subject matter of any of Examples 17-19, wherein the PDU session is carried on a general packet radio service (GPRS) tunneling protocol (GTP) tunnel.

In Example 21, the subject matter of Example 20, wherein the PDU session ID is based on a tunnel endpoint identifier (TEID) for the GTP tunnel.

In Example 22, the subject matter of any of Examples 20-21, wherein extracting the ICN packet from the from the PDU includes removing a GTP tunnel header, a user data protocol (UDP) header, or outer internet protocol (IP) packet header.

In Example 23, the subject matter of any of Examples 20-22, wherein the GTP tunnel is an N3 tunnel between the UPF node and a gNodeB base station.

In Example 24, the subject matter of any of Examples 20-23, wherein the GTP tunnel is an N9 tunnel between the UPF node and an intermediate UPF node.

Example 25 is a system for an information centric network (ICN) unstructured data carrier, the system comprising: means for receiving, at a user plane function (UPF) node, an initiation for a packet data unit (PDU) session of user equipment (UE), the initiation including an indication for an ICN session and a PDU session identification (ID); means for mapping the PDU session to the PDU session ID in an ICN routing data structure, the ICN routing data structure being a pending interest table (PIT) or a forwarding interest base (FIB); means for receiving an ICN packet from the UE contained within a PDU on from the PDU session, the ICN packet being an interest packet or a data packet, the PDU conforming to an unstructured-data classification as defined by a third generation partnership project (3GPP) 5G family of standards; means for extracting the ICN packet from the PDU; and means for routing the ICN packet in accordance with the ICN routing data structure.

In Example 26, the subject matter of Example 25, wherein the initiation includes a packet data network (PDN) type that has a value of zero, six, or seven as the indication for the ICN session.

In Example 27, the subject matter of Example 26, wherein the PDN type was used to select the UPF node from a second UPF node, the second UPF node lacking ICN processing capabilities.

In Example 28, the subject matter of any of Examples 25-27, wherein the PDU session is carried on a general packet radio service (GPRS) tunneling protocol (GTP) tunnel.

In Example 29, the subject matter of Example 28, wherein the PDU session ID is based on a tunnel endpoint identifier (TEID) for the GTP tunnel.

In Example 30, the subject matter of any of Examples 28-29, wherein the means for extracting the ICN packet from the from the PDU include means for removing a GTP tunnel header, a user data protocol (UDP) header, or outer internet protocol (IP) packet header.

In Example 31, the subject matter of any of Examples 28-30, wherein the GTP tunnel is an N3 tunnel between the UPF node and a gNodeB base station.

In Example 32, the subject matter of any of Examples 28-31, wherein the GTP tunnel is an N9 tunnel between the UPF node and an intermediate UPF node.

Example 33 is at least one machine-readable medium including instructions that, when executed by processing circuitry, cause the processing circuitry to perform operations to implement of any of Examples 1-32.

Example 34 is an apparatus comprising means to implement of any of Examples 1-32.

Example 35 is a system to implement of any of Examples 1-32.

Example 36 is a method to implement of any of Examples 1-32.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. An apparatus for an information centric network (ICN) unstructured data carrier, the apparatus comprising:
   machine readable media including instructions; and
   processing circuitry that, when in operation, is configured by the instructions to:
      receive, at a user plane function (UPF) node, an initiation for a packet data unit (PDU) session of a user equipment (UE), the initiation including an indication for an ICN session and a PDU session identification (ID), wherein the initiation includes a packet data network (PDN) type that has a value of zero, six, or seven as the indication for the ICN session, and wherein the PDN type was used to select the UPF node from a second UPF node, the second UPF node lacking ICN processing capabilities;
      map the PDU session to the PDU session ID in an ICN routing data structure, the ICN routing data structure being a pending interest table (PsIT) or a forwarding interest base (FIB);
      receive an ICN packet from the UE contained within a PDU on from the PDU session, the ICN packet being an interest packet or a data packet, the PDU conforming to an unstructured-data classification as defined by a third generation partnership project (3GPP) 5G family of standards;
      extract the ICN packet from the PDU; and
      route the ICN packet in accordance with the ICN routing data structure.

2. The apparatus of claim 1, wherein the PDU session is carried on a general packet radio service (GPRS) tunneling protocol (GTP) tunnel.

3. The apparatus of claim 2, wherein the PDU session ID is based on a tunnel endpoint identifier (TEID) for the GTP tunnel.

4. The apparatus of claim 2, wherein, to extract the ICN packet from the PDU, the processing circuitry is configured to remove a GTP tunnel header, a user data protocol (UDP) header, or outer internet protocol (IP) packet header.

5. The apparatus of claim 2, wherein the GTP tunnel is an N3 tunnel between the UPF node and a gNodeB base station.

6. The apparatus of claim 2, wherein the GTP tunnel is an N9 tunnel between the UPF node and an intermediate UPF node.

7. A method for an information centric network (ICN) unstructured data carrier, the method comprising:
   receiving, at a user plane function (UPF) node, an initiation for a packet data unit (PDU) session of a user equipment (UE), the initiation including an indication for an ICN session and a PDU session identification (ID), wherein the initiation includes a packet data network (PDN) type that has a value of zero, six, or seven as the indication for the ICN session, and wherein the PDN type was used to select the UPF node from a second UPF node, the second UPF node lacking ICN processing capabilities;
   mapping the PDU session to the PDU session ID in an ICN routing data structure, the ICN routing data structure being a pending interest table (PIT) or a forwarding interest base (FIB);
   receiving an ICN packet from the UE contained within a PDU on from the PDU session, the ICN packet being an interest packet or a data packet, the PDU conforming to an unstructured-data classification as defined by a third generation partnership project (3GPP) 5G family of standards;
   extracting the ICN packet from the PDU; and
   routing the ICN packet in accordance with the ICN routing data structure.

8. The method of claim 7, wherein the PDU session is carried on a general packet radio service (GPRS) tunneling protocol (GTP) tunnel.

9. The method of claim 8, wherein the PDU session ID is based on a tunnel endpoint identifier (TEID) for the GTP tunnel.

10. The method of claim 8, wherein extracting the ICN packet from the from the PDU includes removing a GTP tunnel header, a user data protocol (UDP) header, or outer internet protocol (IP) packet header.

11. The method of claim 8, wherein the GTP tunnel is an N3 tunnel between the UPF node and a gNodeB base station.

12. The method of claim 8, wherein the GTP tunnel is an N9 tunnel between the UPF node and an intermediate UPF node.

13. At least one non-transitory machine readable medium including instructions for an information centric network (ICN) unstructured data carrier, the instructions, when executed by processing circuitry, cause the processing circuitry to perform operations comprising:
    receiving, at a user plane function (UPF) node, an initiation for a packet data unit (PDU) session of user equipment (UE), the initiation including an indication for an ICN session and a PDU session identification (ID), wherein the initiation includes a packet data network (PDN) type that has a value of zero, six, or seven as the indication for the ICN session, and wherein the PDN type was used to select the UPF node from a second UPF node, the second UPF node lacking ICN processing capabilities;
    mapping the PDU session to the PDU session ID in an ICN routing data structure, the ICN routing data structure being a pending interest table (PIT) or a forwarding interest base (FIB);
    receiving an ICN packet from the UE contained within a PDU on from the PDU session, the ICN packet being an interest packet or a data packet, the PDU conforming to an unstructured-data classification as defined by a third generation partnership project (3GPP) 5G family of standards;
    extracting the ICN packet from the PDU; and
    routing the ICN packet in accordance with the ICN routing data structure.

14. The at least one non-transitory machine readable medium of claim 13, wherein the PDU session is carried on a general packet radio service (GPRS) tunneling protocol (GTP) tunnel.

15. The at least one non-transitory machine readable medium of claim 14, wherein the PDU session ID is based on a tunnel endpoint identifier (TEID) for the GTP tunnel.

16. The at least one non-transitory machine readable medium of claim 14, wherein extracting the ICN packet from the from the PDU includes removing a GTP tunnel header, a user data protocol (UDP) header, or outer internet protocol (IP) packet header.

17. The at least one non-transitory machine readable medium of claim 14, wherein the GTP tunnel is an N3 tunnel between the UPF node and a gNodeB base station.

18. The at least one non-transitory machine readable medium of claim 14, wherein the GTP tunnel is an N9 tunnel between the UPF node and an intermediate UPF node.

* * * * *